(12) United States Patent
Lee et al.

(10) Patent No.: US 10,858,465 B2
(45) Date of Patent: Dec. 8, 2020

(54) ETHYLENE/ALPHA-OLEFIN COPOLYMER

(71) Applicant: LG CHEM, LTD., Seoul (KR)

(72) Inventors: Jeong Kyu Lee, Daejeon (KR); Pum Suk Park, Daejeon (KR); In Young Song, Daejeon (KR); Sung Joon Oh, Daejeon (KR); Yi Young Choi, Daejeon (KR); Soon Ho Sun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 127 days.

(21) Appl. No.: 16/323,991

(22) PCT Filed: Oct. 25, 2017

(86) PCT No.: PCT/KR2017/011852
§ 371 (c)(1),
(2) Date: Feb. 7, 2019

(87) PCT Pub. No.: WO2018/088725
PCT Pub. Date: May 17, 2018

(65) Prior Publication Data
US 2019/0211122 A1 Jul. 11, 2019

(30) Foreign Application Priority Data
Nov. 8, 2016 (KR) .................. 10-2016-0148267

(51) Int. Cl.
*C08F 210/16* (2006.01)
*C08F 4/6592* (2006.01)
*C08F 4/659* (2006.01)

(52) U.S. Cl.
CPC ........ *C08F 210/16* (2013.01); *C08F 4/65904* (2013.01); *C08F 4/65912* (2013.01); *C08F 4/65916* (2013.01); *C08F 4/65925* (2013.01); *C08F 4/65927* (2013.01); *C08F 2420/06* (2013.01)

(58) Field of Classification Search
CPC .................................................. C08F 210/16
See application file for complete search history.

(56) References Cited

U.S. PATENT DOCUMENTS

| | | | |
|---|---|---|---|
| 2003/0008997 A1 | 1/2003 | Murakami et al. | |
| 2010/0234507 A1 | 9/2010 | Pezzutti et al. | |
| 2011/0020625 A1* | 1/2011 | Iwata | B29C 48/397 428/220 |
| 2011/0032621 A1 | 2/2011 | Marchand et al. | |
| 2012/0277388 A1 | 11/2012 | Sirol et al. | |
| 2013/0059967 A1* | 3/2013 | Liang | C08L 23/02 524/528 |
| 2015/0141579 A1 | 5/2015 | Bellehumeur et al. | |
| 2016/0280813 A1 | 9/2016 | Kwon et al. | |
| 2017/0044278 A1 | 2/2017 | Lee et al. | |
| 2018/0030180 A1 | 2/2018 | Sung et al. | |

FOREIGN PATENT DOCUMENTS

| | | |
|---|---|---|
| EP | 0 423962 A2 | 4/1991 |
| EP | 3056524 A1 | 8/2016 |
| JP | 6-293812 A | 10/1994 |
| JP | 8-27211 A | 1/1996 |
| JP | 11-060633 A | 3/1999 |
| JP | 2000-326406 A | 11/2000 |
| JP | 2011-511139 A | 4/2011 |
| JP | 2016-538413 A | 12/2016 |
| KR | 10-0522322 B1 | 10/2005 |
| KR | 10-2011-0119740 A | 11/2011 |
| KR | 10-1472643 B1 | 12/2014 |
| KR | 10-2015-0066484 A | 6/2015 |
| KR | 10-2015-0144281 A | 12/2015 |
| KR | 10-2016-0121940 A | 10/2016 |
| KR | 10-2016-0122065 A | 10/2016 |
| KR | 10-2018-0040999 A | 4/2018 |
| KR | 10-2018-0043680 A | 4/2018 |
| WO | 2015/194813 A1 | 12/2015 |
| WO | 2016/036221 A1 | 3/2016 |
| WO | 2016/060445 A1 | 4/2016 |
| WO | 2016/093549 A2 | 6/2016 |
| WO | 2016/172099 A1 | 10/2016 |

OTHER PUBLICATIONS

J. Brandrup, et al. (1990); Polymer Handbook, 3rd Edition; pp. 361-362.

* cited by examiner

*Primary Examiner* — Wenwen Cai
(74) *Attorney, Agent, or Firm* — Dentons US LLP

(57) ABSTRACT

The present invention relates to an ethylene/alpha-olefin copolymer and, more particularly, to an ethylene/alpha-olefin copolymer that exhibits excellent environmental stress crack resistance by appropriately controlling the ratio of crystal structure domain and amorphous domain, and the like. The ethylene/alpha-olefin copolymer comprises an ethylene repeating unit and an alpha-olefin repeating unit, and has a crystal structure including a crystalline domain containing lamellar crystals and an amorphous domain containing a tie molecule that mediates bonding between the lamellar crystals. The lamellar crystal thickness (dc) of the ethylene/alpha-olefin copolymer as calculated from the result of Small Angle X-ray Scattering (SAXS) analysis is between 12.0 and 16.0 nm, the amorphous domain thickness (da) is between 4.0 and 5.3 nm, and the thickness ratio da/dc is between 0.3 and 0.4.

11 Claims, 4 Drawing Sheets

[FIG. 1]
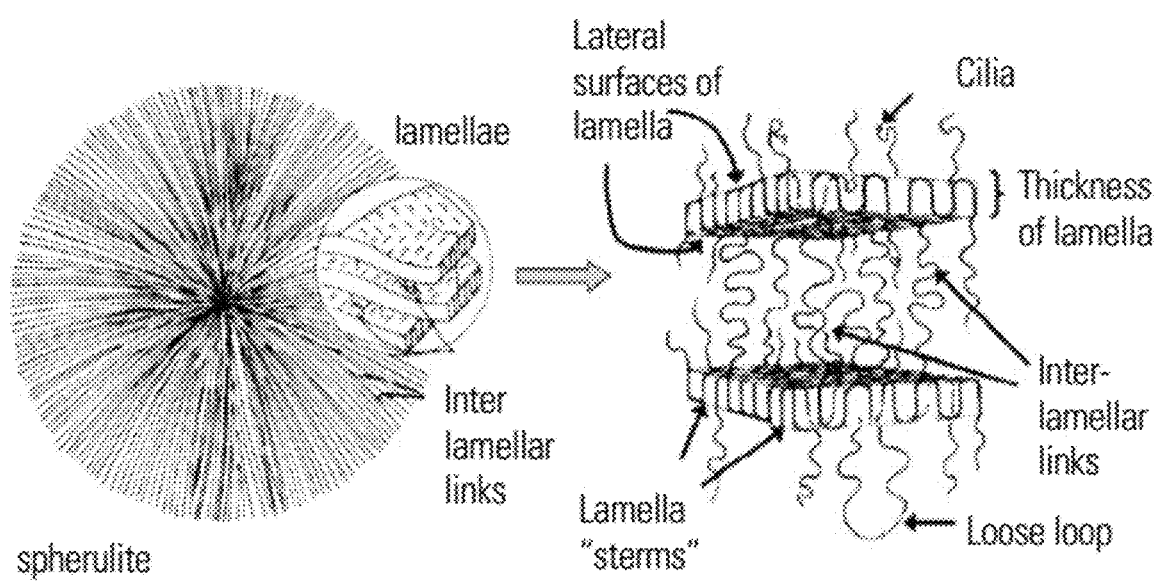

[FIG. 2a]
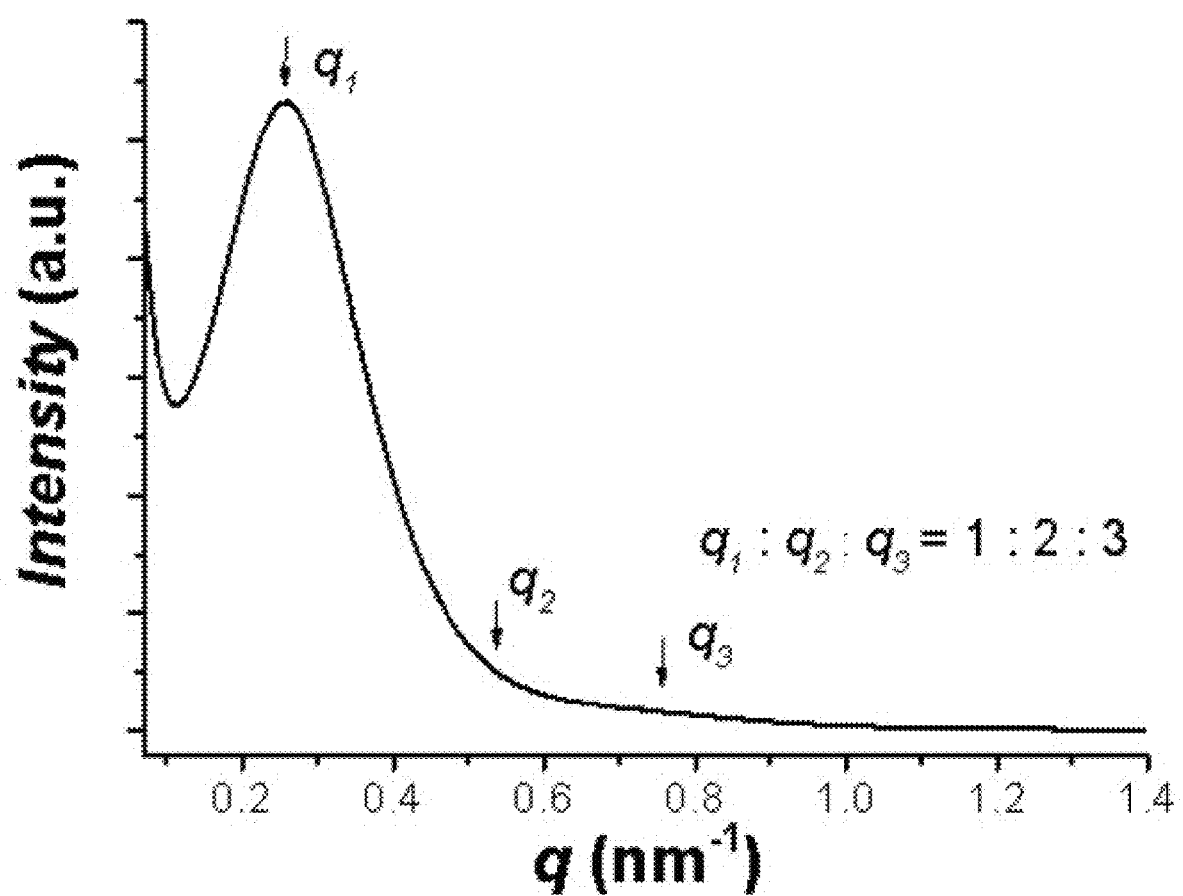

[FIG. 2b]
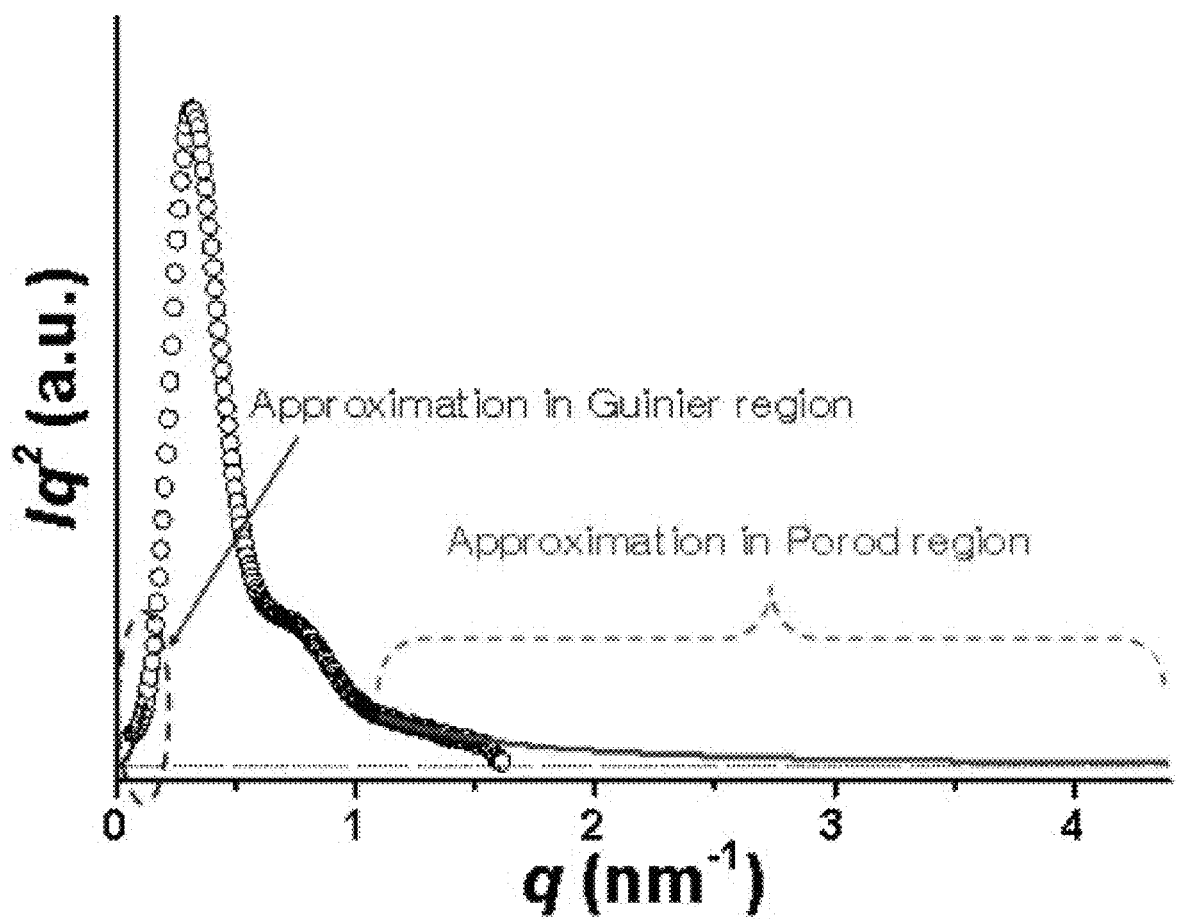

[FIG. 2c]
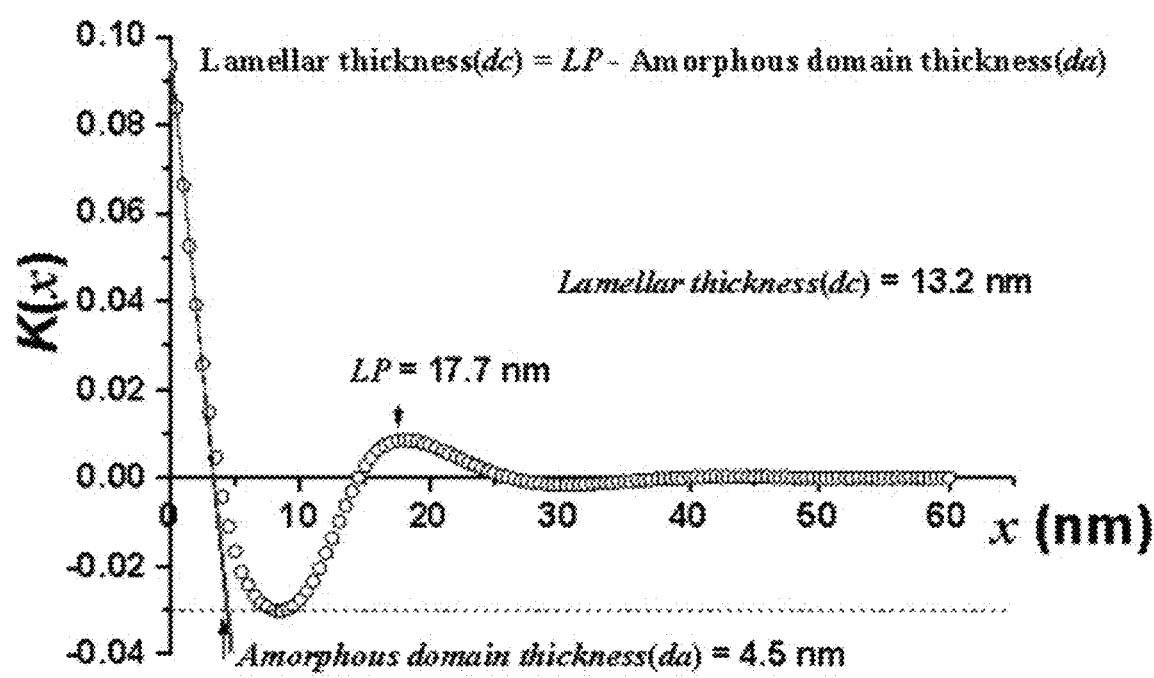

ETHYLENE/ALPHA-OLEFIN COPOLYMER

CROSS-REFERENCE TO RELATED APPLICATION(S)

This application is a national stage entry pursuant to 35 U.S.C. § 371 of International Application No. PCT/KR2017/011852 filed Oct. 25, 2017, which claims the benefits of the filing date of Korean Patent Application No. 10-2016-0148267 filed with Korean Intellectual Property Office on Nov. 8, 2016, the entire contents of which is incorporated herein by reference.

TECHNICAL FIELD

The present invention relates to an ethylene/alpha-olefin copolymer exhibiting excellent environmental stress crack resistance.

BACKGROUND

Polyethylene mainly composed of an ethylene/alpha-olefin copolymer is a typical semi-crystalline polymer material, and is widely used in various industrial applications. Specifically, the polyethylene, for example, a high density polyethylene is typically used for various applications such as molding or forming various containers such as paint containers or food containers, or molding or forming various pipes such as gas line pipes. In particular, the high density polyethylene has many advantages such as being light weight, exhibiting corrosion resistance, and being ease to install as compared with other resins or materials known to be applicable to the formation of pipes.

However, it is known that the high density polyethylene is poor in environmental stress crack resistance (ESCR), exhibits poor mechanical properties and durability under various environmental factors in which the pipes and various containers are exposed. Accordingly, various attempts have been made to improve the environmental stress crack resistance of such high density polyethylene by controlling polymerization catalysts, polymerization conditions and various physical properties of polyethylene.

Nevertheless, the high density polyethylene exhibiting sufficient environmental stress crack resistance has not been properly developed and provided.

Technical Problem

The present invention provides an ethylene/alpha-olefin copolymer which exhibits excellent environmental stress crack resistance by appropriately controlling the ratio of crystal structure domain and amorphous domain, and the like.

Technical Solution

The present invention provides an ethylene/alpha-olefin copolymer comprising an ethylene repeating unit and an alpha-olefin repeating unit,
wherein the copolymer has a crystal structure including a crystalline domain containing lamellar crystals and an amorphous domain containing a tie molecule that mediates bonding between the lamellar crystals, and
wherein the lamellar crystal thickness (dc) calculated from the result of Small Angle X-ray Scattering (SAXS) analysis is between 12.0 and 16.0 nm, the amorphous domain thickness (da) is between 4.0 and 5.3 nm, and the thickness ratio calculated from the formula da/dc is between 0.3 and 0.4.

BRIEF DESCRIPTION OF THE DRAWINGS

FIG. 1 is a schematic diagram showing the crystal structure of polyethylene (ethylene/alpha-olefin copolymer).

FIGS. 2a-2c are graphs showing the results of SAXS analysis of the ethylene/alpha-olefin copolymer of Example 1 (FIG. 2a), and diagrams illustrating the process of calculating the lamellar crystal thickness (dc) and the amorphous domain thickness (da) from the results of the analysis (FIGS. 2b and 2c).

ADVANTAGEOUS EFFECTS

The ethylene/alpha-olefin copolymer according to the present invention can have a novel crystal structure in which its crystal structure, for example, the lamellar crystal thickness, the amorphous domain thickness and the ratio thereof, forming the crystal structure, and the tie molecule fraction contained in the amorphous domain, and the like are appropriately controlled. Due to such novel crystal structure, the ethylene/alpha-olefin copolymer can exhibit more improved environmental stress crack resistance.

Therefore, the ethylene/alpha-olefin copolymer can be suitably used for various applications including formation of various pipes, containers and the like.

DETAILED DESCRIPTION OF THE EMBODIMENTS

The technical terms used herein is for the purpose of describing exemplary embodiments only and is not intended to limit the scope of the invention. The singular forms "a," "an" and "the" are intended to include plural forms, unless the context clearly indicates otherwise. It should be understood that the terms "comprise," "include", "have", etc. are used herein to specify the presence of stated features, numbers, steps, components or combinations thereof, but do not preclude the presence or addition of one or more other features, numbers, steps, components, or combinations thereof.

Since the embodiments of the present invention are susceptible to various modifications and alternative forms, specific embodiments thereof will be illustrated and described in detail below. It should be understood, however, that the present invention is not limited to the particular embodiments disclosed, but on the contrary, the invention is to cover all modifications, equivalents, and alternatives falling within the spirit and scope of the invention.

Hereinafter, the ethylene/alpha-olefin copolymer according to specific embodiments of the present invention will be described in more detail.

According to one embodiment of the present invention, there is provided an ethylene/alpha-olefin copolymer comprising an ethylene repeating unit and an alpha-olefin repeating unit,
wherein the copolymer has a crystal structure comprising a crystalline domain containing lamellar crystals and an amorphous domain containing a tie molecule that mediates bonding between the lamellar crystals, and
wherein the lamellar crystal thickness (dc) calculated from the result of Small Angle X-ray Scattering (SAXS) analysis is between 12.0 and 16.0 nm, the amorphous domain thickness (da) is between 4.0 and 5.3 nm, and the thickness ratio calculated from the formula da/dc is between 0.3 and 0.4

As a result of experiments, the present inventors have found that as the ethylene/alpha-olefin copolymer of one embodiment is prepared by a predetermined hybrid supported metallocene catalyst or the like described below, it shows a new crystal structure. Due to such novel crystal structure, it has been found that the copolymer of one embodiment exhibits more improved environmental stress crack resistance. The present invention has been completed on the basis of such findings.

The novel crystal structure of the copolymer of such one embodiment will be described in detail below. In FIG. 1, the crystal structure of polyethylene (ethylene/alpha-olefin copolymer) is schematically shown.

The ethylene/alpha-olefin copolymer is a semi-crystalline polymer, and may include a crystalline domain and an amorphous domain. Specifically, as shown in FIG. 1, the crystalline domain may include, for example, lamellar crystals containing ethylene repeating units and/or alpha-olefin repeating units. More specifically, the polymer chains including the ethylene repeating unit and/or the alpha-olefin repeating unit form a bundle while being folded, thereby forming a crystalline block in the form of a lamellar. The lamellar crystal refers to a crystalline block in the form of such lamellar, and through such lamellar crystals, the crystallinity, mechanical properties, etc. of the ethylene/alpha-olefin copolymer can be realized.

Meanwhile, the lamellar crystals are composed of a crystalline domain, and many of these lamellar crystals and crystalline domains can gather together to form three-dimensionally grown spherulite, wherein the domain outside the lamellar crystal corresponds to an amorphous domain. More specifically, the amorphous domain includes: i) cilia in which a chain starts at a crystalline domain and ends at an amorphous domain, ii) a loose loop in which the chain links one lamellar crystal and iii) an inter-lamellar link in which the chain links two lamellar crystals together, and one molecule that links two lamellar crystals of such inter-lamellar link can be defined as a tie molecule. That is, the tie molecule serves to mediate bonding between lamellar crystals in the above-mentioned olefin/alpha-olefin copolymer forming spherulite. The elastic properties of the ethylene/alpha-olefin copolymer may be realized by such tie molecules and amorphous domains.

That is, the ethylene/alpha-olefin copolymer can exhibit a crystal structure which comprises a crystalline domain including a lamellar crystal containing an ethylene repeating unit and/or an alpha-olefin repeating unit, and an amorphous domain including a tie molecule that mediates bonding between the lamellar crystals. The tie molecule mediating bonding between the lamellar crystals means that one end of the tie molecule forms a bond with one lamellar crystal, the other end of the tie molecule forms a bond with another lamellar crystal, and two or more lamellar crystals are linked by the tie molecule.

The present inventors have conducted SAXS (Small Angle X-ray Scattering) analysis on an ethylene/alpha-olefin copolymer having such a crystal structure, and have measured and analyzed the lamellar crystal thickness (dc), the amorphous domain thickness (da), the thickness ratio between them, and the tie molecule fraction, which can be calculated from the values of dc and da. In addition, the inventors have studied about the relationship between the physical property values relating to these crystal structures, and the environmental stress crack resistance of the ethylene/alpha-olefin copolymer.

As a result of these studies, it has been found that the ethylene/alpha-olefin copolymer has a crystal structure in which the lamellar crystal thickness (dc) is between 12.0 and 16.0 nm, or between 12.5 and 15 nm, or between 12.9 and 14.0 nm, the amorphous domain thickness (da) is between 4.0 and 5.3 nm, or between 4.3 and 5.0 nm, and the thickness ratio calculated from the formula da/dc is between 0.3 and 0.4, or between 0.32 and 0.38, or between 0.33 and 0.36, and thereby the ethylene/alpha-olefin copolymer of one embodiment of the invention exhibits more improved environmental stress crack resistance.

In addition, it has been found that the ethylene/alpha-olefin copolymer of one embodiment of the invention can exhibit characteristics that the values of dc and da, and the tie molecule fraction calculated from the following equation 1 are between 0.07 and 0.1, or between 0.08 and 0.1, or between 0.09 and 0.1, and thereby, it can exhibit more improved environmental stress crack resistance:

$$P(Mw) = \frac{1}{3}\left(\frac{\int_{2d_c+d_a}^{\infty} r^2 \exp(-b^2 r^2)\,dr}{\int_0^{\infty} r^2 \exp(-b^2 r^2)\,dr}\right) \quad \text{[Equation 1]}$$

in the above equation 1, P(Mw) represents a tie molecule fraction on the basis of molecular weight, dc and da are a lamellar crystal thickness (dc) and an amorphous domain thickness (da), <r> represents an end-to-end distance of a random coil according to the molecular weight (Mw), and $b^2$ is $3/(2<r>^2)$.

This is predicted because the copolymer of one embodiment exhibiting the aforementioned novel crystal structural characteristics, that is, the aforementioned characteristic of the dc, da, da/dc, and tie molecule fraction has a crystalline domain at a proper proportion, and also contains an amorphous domain and a tie molecule at a higher proportion. That is, it is considered that in the copolymer of one embodiment, the basic mechanical properties are excellent due to a proper proportion of the crystalline domain, and also the tie molecule fraction is high and thus the connection between the lamellar crystals is strong and the whole crystal is well bonded. Thus, the copolymers of one embodiment are believed to be able to better bond the overall crystal structure and to exhibit more improved environmental stress crack resistance.

Meanwhile, respective characteristics of the aforementioned dc, da, da/dc and the tie molecule fraction can be analyzed and measured by the method described below.

First, when the SAXS analysis is performed on the copolymer of one embodiment, for example, the analysis result as shown in FIG. 2A can be derived. Since the SAXS analysis is basically a crystal analysis method using X-ray diffraction, the ratio of the position value (i.e., the q value) of each peak scattering vector of the SAXS analysis result resulting from a plurality of lamellar crystals according to Bragg's law of the following equation 2 can satisfy the relationship of $q_1:q_2:q_3: \ldots q_n = 1:2:3: \ldots n$.

Bragg's Law: [Equation 2]

$$2d\sin\theta = n\lambda$$

$$q_n = \frac{4\pi\sin\theta n}{\lambda} = \frac{2n\pi}{d}$$

wherein,
q: scattering vector
θ: scattered angle
λ: Incident X-ray wavelength

For example, in the analysis result of SAXS as shown in FIG. 2a, from the viewpoint of satisfying the relationship of $q_1:q_2=1:2$ or $q_1:q_2:q_3=1:2:3$, it can be confirmed that the copolymer contains a plurality of lamellar crystals, and an amorphous domain is contained between them.

In addition, from the pattern of the position (q, x axis) vs. scattering intensity (y axis) of the scattering vector obtained as a result of the SAXS analysis, the smaller scattering vector region (e.g., Guinier region of FIG. 2b) and a larger scattering vector region (e.g., Porod region of FIG. 2b) can be distinguished, among which the smaller scattering vector region (e.g., Guinier region of FIG. 2b) can be approximated using a quadratic equation, and the larger scattering vector region (Porod region of FIG. 2b) can be approximated using Vonk's equation. The total function value of the scattering intensity for each scattering vector with respect to the total scattering vector region thus obtained is derived as a normalized correlation function ( ) using the following equation 3, and thereby, a graph as shown in FIG. 2c can be obtained.

Normalized correlation function (γ1(x)) [Equation 3]

$$\gamma 1(x) = \frac{\oint (I(q) - B(q))q^2 \cos qx \, dq}{\oint (I(q) - B(q))q^2 \, dq}$$

in the above equation 3, x represents an actual spatial distance, $\gamma_1$ represents a normalized correlation function, q represents the position of the scattering vector, I(q) represents the scattering intensity for each scattering vector, and B(q) represents a background scattering intensity.

From the graph of FIG. 2c, a linear section at x=0 is fitted to obtain a straight line (red straight line in FIG. 2c), and the distance x (nm) value among the coordinates of the points at which the straight lines meet the extended line of the lowermost point of the graph (black dotted line in FIG. 2c) can be measured/calculated as the amorphous domain thickness (da). Further, in the above graph, the distance x (nm) value in the coordinates of the peak point (LP in FIG. 2c) can be measured/calculated by the sum of dc+da, and from these, the thickness ratio defined by the lamellar crystal thickness (dc) and the formula da/dc can be calculated.

In addition, the tie molecule fraction contained in the copolymer of one embodiment can be calculated from the measured values of dc and da and the calculation result of the following equation 1. For reference, in the equation 1, the denominator expression may mean the distribution of end-to-end distance of the entire polymer chain (random coil), whereby the equation 1 may means the probability that both ends of the polymer chain are present at the distance between the two lamellar crystals and the amorphous domain contained between them (that is, the probability of existence, referred to as a tie molecule fraction), in the distribution of end-to-end distance of the entire polymer chain (random coil).

$$P(Mw) = \frac{1}{3}\left(\frac{\int_{2d_c+d_a}^{\infty} r^2 \exp(-b^2 r^2) dr}{\int_0^{\infty} r^2 \exp(-b^2 r^2) dr}\right)$$ [Equation 1]

in the above equation 1, P(Mw) represents a tie molecule fraction on the basis of molecular weight,
dc and da are a lamellar crystal thickness (dc) and an amorphous domain thickness (da),
<r> represents an end-to-end distance of a random coil according to the molecular weight (Mw), and
$b^2$ is $3/(2<r>^2)$.

In addition, the <r> can be calculated as a value according to the molecular weight by the formula $<r>/(Mw)^{1/2}*10^4=1070$ nm, and the molecular weight (Mw) dependence of such <r> is disclosed in POLYMER HANDBOOK, $3^{rd}$ edition, J. BRANDRUP and E. H. IMMERGUT (editors) (1990).

The ethylene/alpha-olefin copolymers in which respective crystal structure characteristics of the dc, da, da/dc and the tie molecule fraction measured according to the aforementioned method satisfy the range of one embodiment can exhibit more improved environmental stress crack resistance and excellent mechanical properties as the ratio of the crystalline domain and the amorphous domain is optimized, and it has a higher tie molecule fraction.

Meanwhile, the ethylene/alpha-olefin copolymer of one embodiment described above has a density of 0.930 g/cm³ to 0.965 g/cm³, or 0.935 g/cm³ to 0.955 g/cm³. When the density of the ethylene/alpha-olefin copolymer is less than 0.930 g/cm³, the bending strength of the product is decreased, and the swelling phenomenon may occur due to the internal pressure. In addition, when the density is excessively increased by decreasing the content of the alpha-olefin, the environmental stress crack resistance of the copolymer may be lowered. As the copolymer of one embodiment has the density range described above, it can exhibit various physical properties suitable for high density polyethylene.

Within the range that satisfies the respective physical properties described above, the ethylene/alpha-olefin copolymer of one embodiment may have a weight average molecular weight (Mw) of 85000 g/mol to 150000 g/mol, or 90000 g/mol to 120000 g/mol. Further, the molecular weight distribution of the copolymer may be from 2 to 6, or from 3 to 5, or from 4 to 4.5. Thereby, the copolymer of one embodiment can exhibit excellent processability, mechanical properties, and the like.

In the copolymer of the one embodiment, the environmental stress crack resistance (ESCR) measured according to ASTM D 1693 may be 100 hours or more. When the environmental stress crack resistance is 100 hours or more, the performance can be stably maintained in the state of use of the pipe and the like, so that the upper limit value is substantially meaningless, but it may be 1,000 hours or less, or 800 hours or less, or about 500 hours or less. In this way, since it exhibits a high performance environmental stress crack resistance, it has high stability and can maintain continuous performance, even when molded into products and used under conditions of high temperature and high pressure.

The ethylene repeating unit means a repeating unit contained in the homopolymer of the ethylene monomer, and the alpha-olefin repeating unit may refer to a repeating unit contained in a homopolymer of an alpha-olefin monomer. Specific examples of the alpha-olefin include propylene, 1-butene, 1-pentene, 4-methyl-1-pentene, 1-hexene, 1-heptene, 1-octene, 1-decene, 1-undecene, 1-dodecene, 1-tetradecene or 1-hexadecene, etc., and a combination of two or more thereof may be used. Preferably, 1-butene, 1-hexene or 1-octene may be used as the alpha-olefin monomer.

In the ethylene/alpha-olefin copolymer, the content of the alpha-olefin as a comonomer is not particularly limited, and can be appropriately selected. More specifically, it may be more than 0 mol % and not more than 99 mol %, or 1 to 50 mol %, or 2 to 30 mol %, or 3 to 20 mol %.

Examples of the method for preparing the ethylene/alpha-olefin copolymer exhibiting the properties of the novel crystal structure as described above are not particularly limited, and for example, it can be prepared using a metallocene catalyst.

In particular, preferably a hybrid metallocene catalyst may be used as the metallocene catalyst, and examples of the hybrid metallocene catalyst may be a mixture of at least one first metallocene compound represented by the following Chemical Formula 1; and at least one second metallocene compound represented by the following Chemical Formula 3.

[Chemical Formula 1]

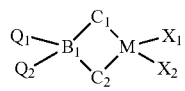

in Chemical Formula 1,

M is a Group 4 transition metal;

$B_1$ is carbon, silicon or germanium;

$Q_1$ and $Q_2$ are the same as or different from each other, and are each independently hydrogen, halogen, C1-C20 alkyl group, C2-C20 alkenyl group, C6-C20 aryl group, C7-C20 alkylaryl group, C7-C20 arylalkyl group, C1-C20 alkoxy group, C2-C20 alkoxyalkyl group, C3-C20 heterocycloalkyl group, or C5-C20 heteroaryl group;

$X_1$ and $X_2$ are the same as or different from each other, and are each independently halogen, C1-C20 alkyl group, C2-C20 alkenyl group, C6-C20 aryl group, nitro group, amido group, C1-C20 alkylsilyl group, C1-C20 alkoxy group, or C1-C20 sulfonate group;

$C_1$ and $C_2$ are the same as or different from each other and are each independently represented by any one of the following Chemical Formula 2a, Chemical Formula 2b, Chemical Formula 2c, or Chemical Formula 2d, provided that at least one of $C_1$ and $C_2$ is represented by Chemical Formula 2a;

[Chemical Formula 2a]

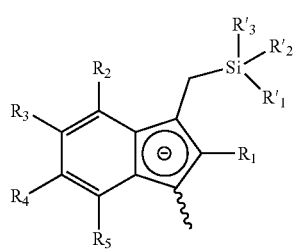

[Chemical Formula 2b]

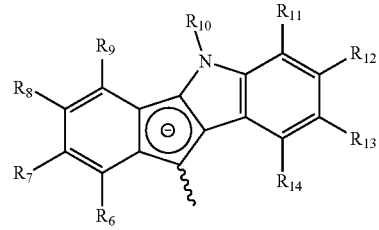

[Chemical Formula 2c]

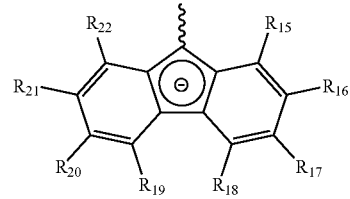

[Chemical Formula 2d]

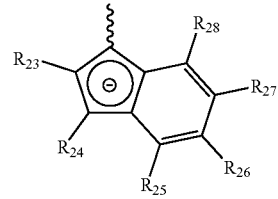

in Chemical Formulas 2a, 2b, 2c and 2d, $R_1$ to $R_{28}$ are the same as or different from each other, and are each independently hydrogen, halogen, C1-C20 alkyl group, C2-C20 alkenyl group, C1-C20 alkylsilyl group, C1-C20 silylalkyl group, C1-C20 alkoxysilyl group, C1-C20 ether group, C1-C20 silyl ether group, C1-C20 alkoxy group, C6-C20 aryl group, C7-C20 alkylaryl group, or C7-C20 arylalkyl group, $R'_1$ to $R'_3$ are the same as or different from each other, and are each independently hydrogen, halogen, C1-C20 alkyl group, C2-C20 alkenyl group, or C6-C20 aryl group, two or more adjacent groups of the $R_1$ to $R_{28}$ may be connected to each other to form a substituted or unsubstituted aliphatic or aromatic ring.

[Chemical Formula 3]

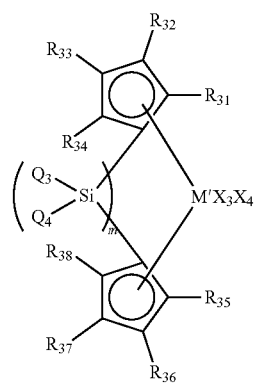

in Chemical Formula 3, at least one of $R_{31}$ to $R_{38}$ is —$(CH_2)_n$—OR (where R is a linear or branched C1-C6 alkyl group, and n is an integer of 2 to 4), the rest are the same as or different from each other, and are each independently a functional group selected from the group consisting of hydrogen, C1-C20 alkyl group, C2-C20 alkenyl group, C6-C20 aryl group, C7-C20 alkylaryl group, and C7-C20 arylalkyl group, or adjacent two or more groups may be connected to each other to form an aliphatic or aromatic ring which is substituted or unsubstituted with C1-C10 hydrocarbyl group, $Q_3$ and $Q_4$ are the same as or different from each other, and are each independently is halogen or C1-C20 alkyl group;

M' is a Group 4 transition metal, $X_3$ and $X_4$ are the same as or different from each other, and are each independently halogen or C1 to C20 alkyl group, and m is an integer of 0 or 1;

The substituents of the Chemical Formulas will be described in more detail as follows.

The C1-C20 alkyl includes a linear or branched alkyl, and specific examples thereof may include methyl, ethyl, propyl, isopropyl, n-butyl, tert-butyl, pentyl, hexyl, heptyl, octyl and the like, but are not limited thereto.

The C2-C20 alkenyl includes a linear or branched alkenyl, and specific examples thereof may include allyl, ethenyl, propenyl, butenyl, pentenyl, and the like, but are not limited thereto.

The C6-C20 aryl includes a single ring aryl or a condensed ring aryl, and specific examples thereof may include phenyl, biphenyl, naphthyl, phenanthrenyl, fluorenyl, and the like, but are not limited thereto.

The C5-C20 heteroaryl includes a single ring heteroaryl or a condensed ring heteroaryl, and specific examples thereof may include carbazolyl, pyridyl, quinoline, isoquinoline, thiophenyl, furanyl, imidazole, oxazolyl, thiazolyl, triazine, tetrahydropyranyl, tetrahydrofuranyl, and the like, but is not limited thereto.

The C1-C20 alkoxy may be methoxy, ethoxy, phenyloxy, cyclohexyloxy, and the like, but is not limited thereto.

The C1-C20 alkylsilyl group may be methylsilyl group, dimethylsilyl group, trimethylsilyl group, and the like, but is not limited thereto.

The C1-C20 silylalkyl group may be silylmethyl group, dimethylsilylmethyl group (—CH$_2$—Si(CH$_3$)$_2$H), trimethylsilylmethyl group (—CH$_2$—Si(CH$_3$)$_3$), but is not limited thereto.

The Group 4 transition metal may be titanium, zirconium, hafnium, and the like, but is not limited thereto.

In the metallocene compound of Chemical Formula 1, it is preferable that $R_1$ to $R_{28}$ in Chemical Formulae 2a, 2b, 2c and 2d are each independently hydrogen, halogen, methyl group, ethyl group, propyl group, isopropyl group, n-butyl group, tert-butyl group, pentyl group, hexyl group, heptyl group, octyl group, ethylene group, propylene group, butylene group, phenyl group, benzyl group, naphthyl group, halogen group, ether group, trimethylsilyl group, triethylsilyl group, tripropylsilyl group, tributylsilyl group, triisopropylsilyl group, trimethylsilylmethyl group, dimethyl ether group, tert-butyldimethylsilyl ether group, methoxy group, ethoxy group, or tert-butoxyhexyl group, but is not limited thereto.

It is preferable that $Q_1$ and $Q_2$ in Chemical Formula 1 are hydrogen, methyl group, ethyl group, propyl group, isopropyl group, n-butyl group, tert-butyl group, methoxymethyl group, tert-butoxymethyl group, 1-ethoxyethyl group, 1-methyl-1-methoxyethyl group, tert-butoxyhexyl group, tetrahydropyranyl group, or tetrahydrofuranyl group, but is not limited thereto.

$B_1$ in Chemical Formula 1 is preferably silicon (Si), but is not limited thereto.

The metallocene compound of Chemical Formula 1 is characterized in that the substituent of Chemical Formula 2a contains at least one of C1-C20 silylalkyl group such as trimethylsilyl methyl.

More specifically, the indene derivative of Chemical Formula 2a has a relatively low electron density as compared with an indenoindole derivative or a fluorenyl derivative, and includes silylalkyl group having a large steric hindrance, due to the steric hindrance effect and the electron density factor, the olefin polymer having a relatively low molecular weight as compared with the metallocene compound having a similar structure can be polymerized with high activity.

In addition, an indenoindole derivative which can be represented by Chemical Formula 2b, a fluorenyl derivative which can be represented by Chemical Formula 2c, and an indene derivative which can be represented by Chemical Formula 2d form a crosslinked structure via a bridge, and have an unshared electron pair capable of acting as a Lewis base in the ligand structure, thereby exhibiting a high polymerization activity.

According to one embodiment of the invention, specific examples of the functional group represented by Chemical Formula 2a may include a compound represented by one of the following structural formulas.

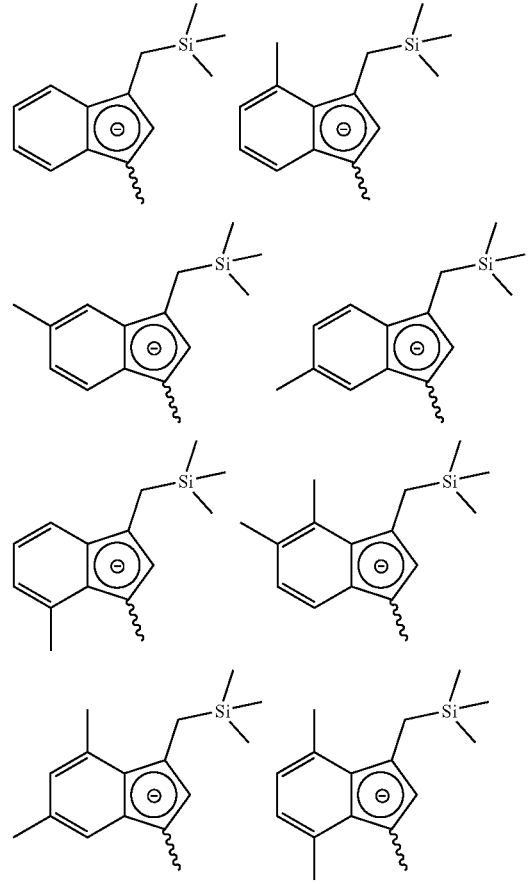

-continued
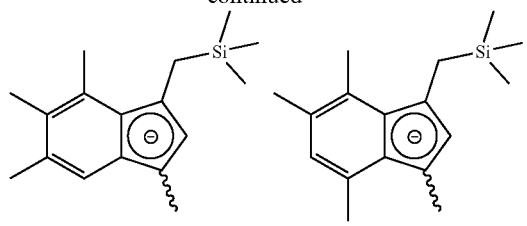
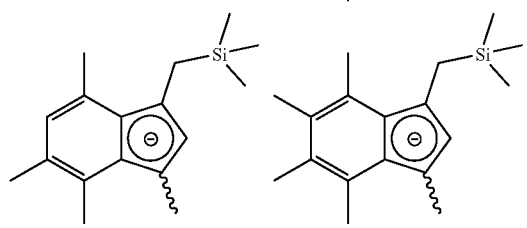
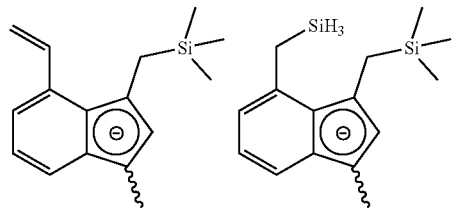
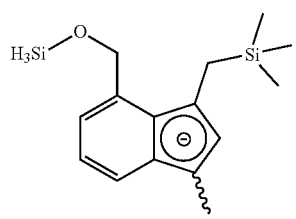
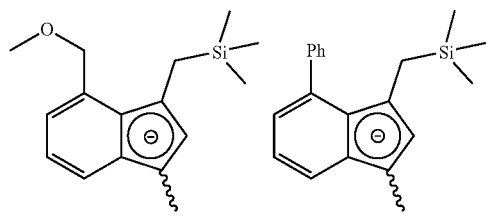
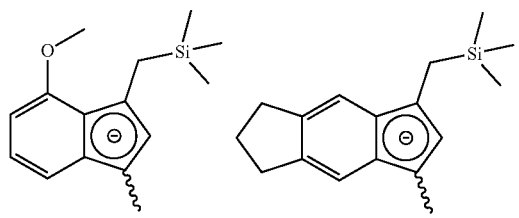
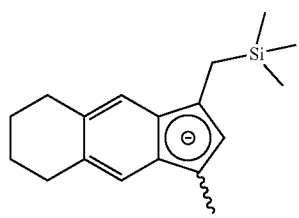
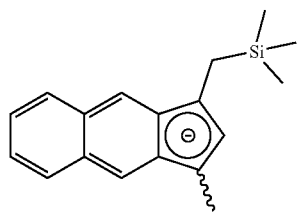
-continued
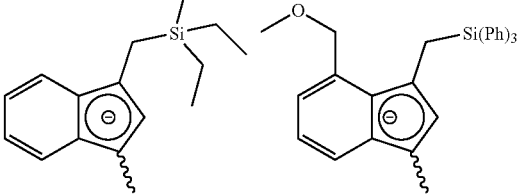
According to one embodiment of the invention, specific examples of the functional group represented by Chemical Formula 2b may include a compound represented by one of the following structural formulas.
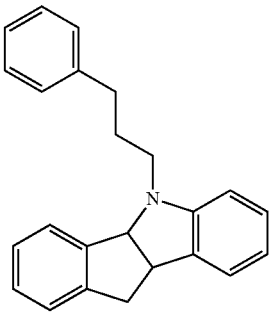
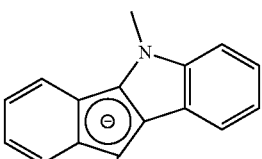
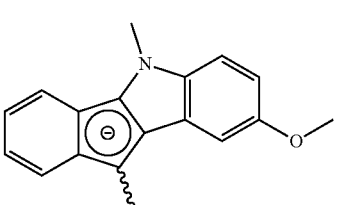

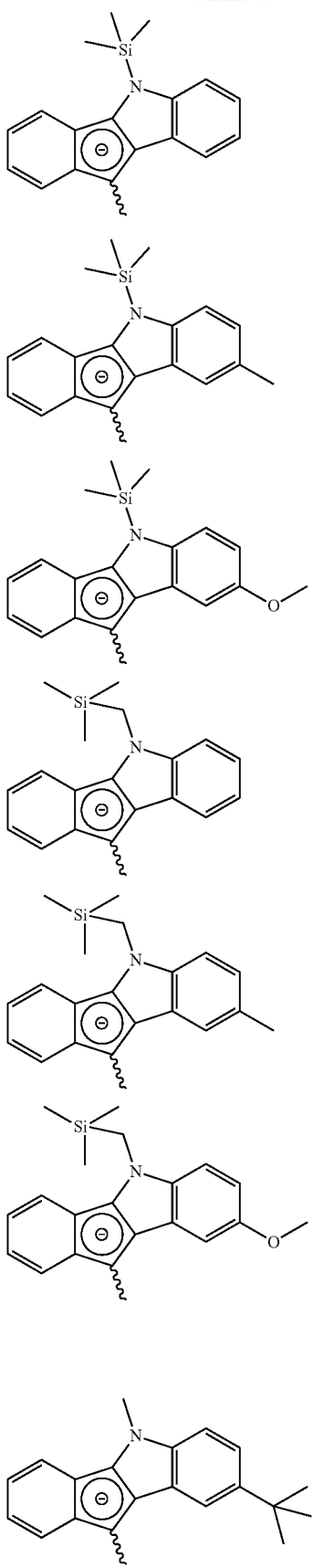
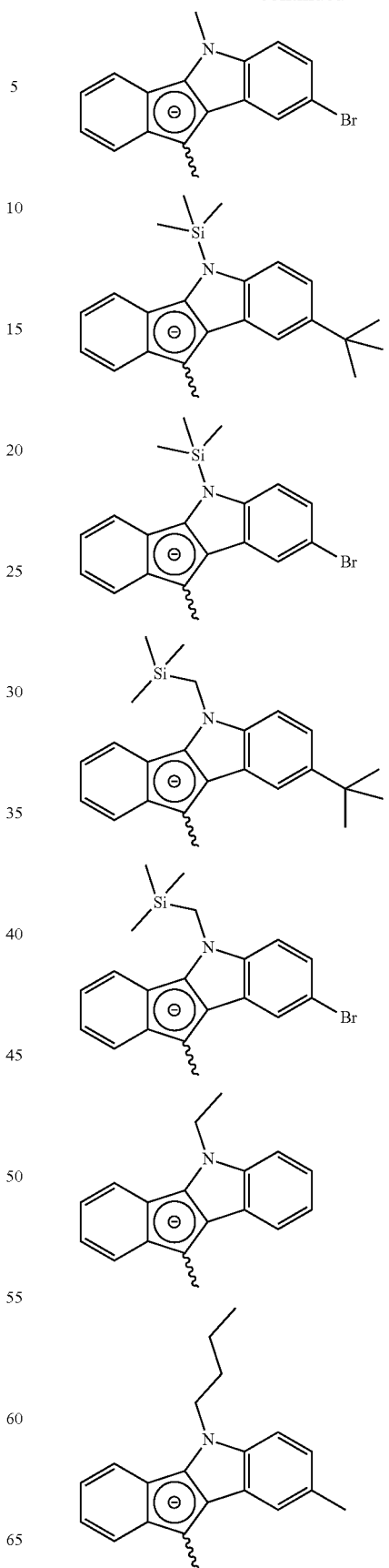

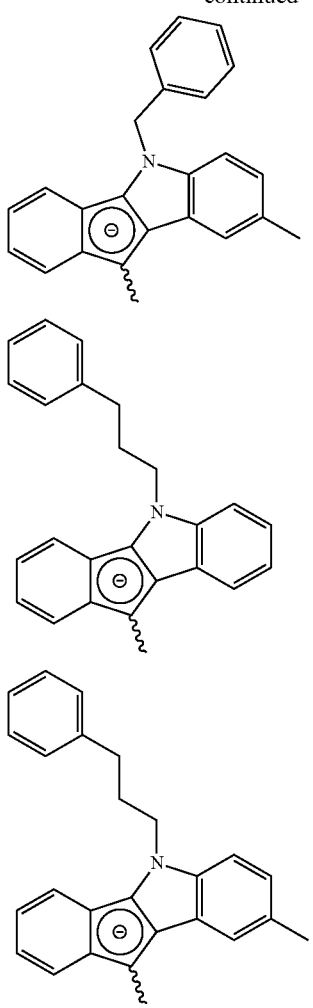
According to one embodiment of the invention, specific examples of the functional group represented by Chemical Formula 2c may include a compound represented by one of the following structural formulas.
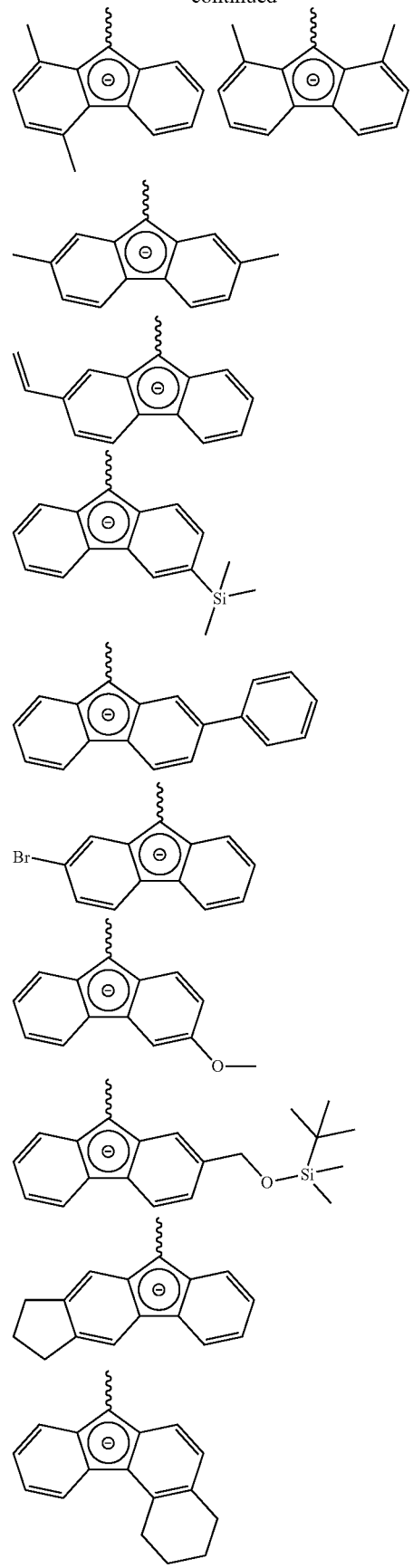

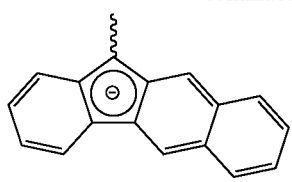
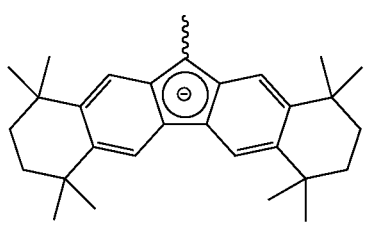
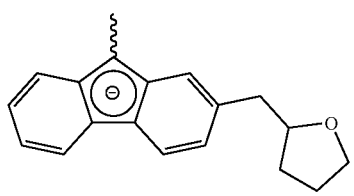
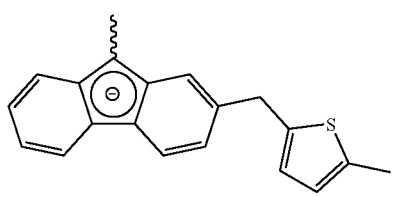
According to one embodiment of the invention, specific examples of the functional group represented by Chemical Formula 2d may include a compound represented by one of the following structural formulas.
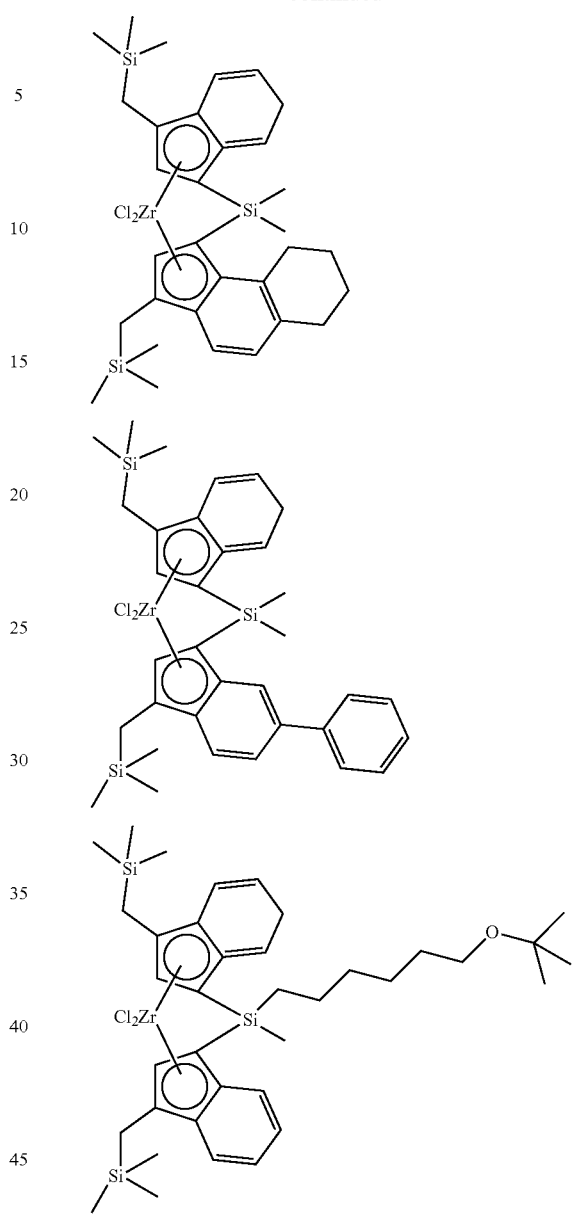
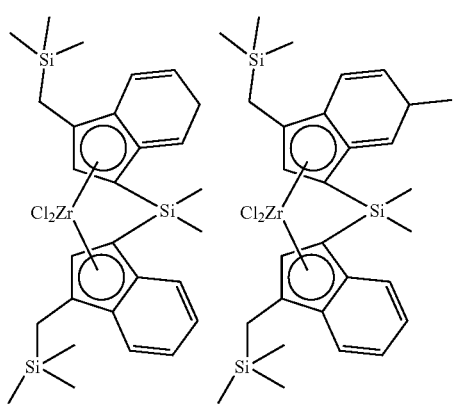
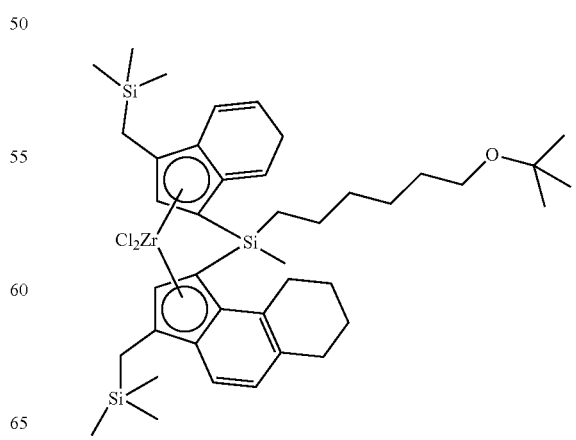

-continued

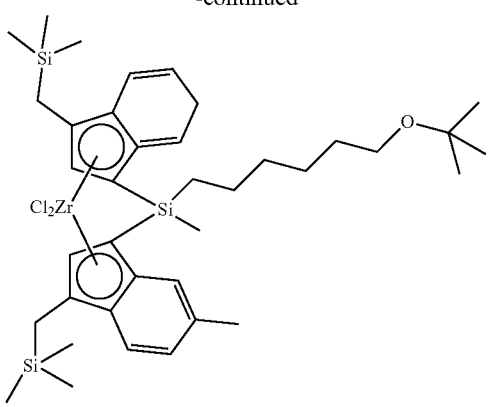
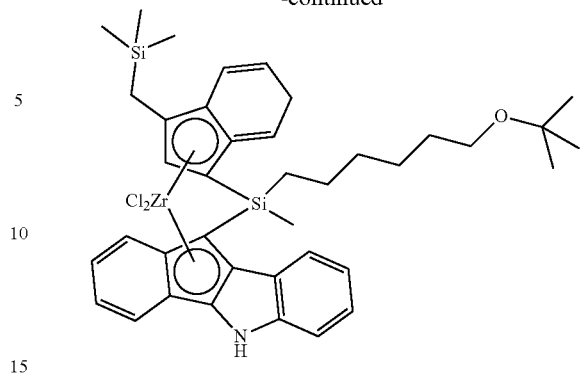
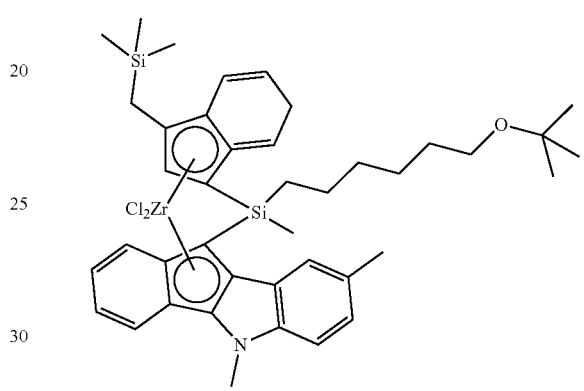
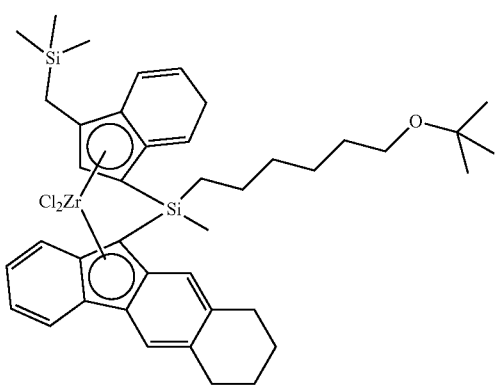
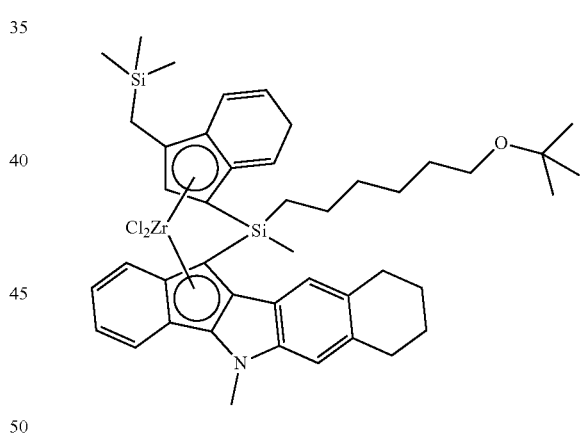
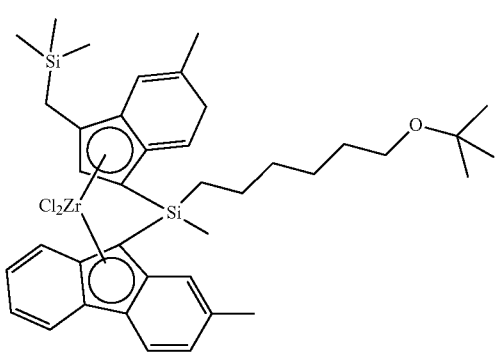

The first metallocene compound of Chemical Formula 1 is superior in activity and can polymerize an ethylene/alpha-olefin polymer having high molecular weight. In particular, even when it is supported on a carrier, it can exhibit high polymerization activity and therefore, it can prepare an ethylene/alpha-olefin polymer of high molecular weight.

According to one embodiment, the metallocene compound of Chemical Formula 1 may be obtained by connecting an indene derivative and a cyclopentadiene derivative with a bridge compound to prepare a ligand compound, and then putting a metal precursor compound therein to carry out a metallation.

The second metallocene compound included in the hybrid metallocene catalyst may be represented by the following Chemical Formula 3.

[Chemical Formula 3]

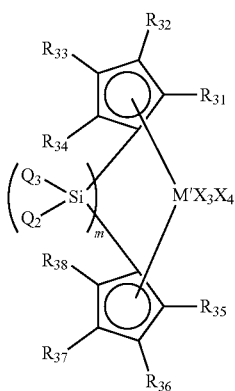

in Chemical Formula 3, at least one of $R_{31}$ to $R_{38}$ is —$(CH_2)_n$—OR (where R is a linear or branched C1-C6 alkyl group, and n is an integer of 2 to 4), the rest are the same as or different from each other, and are each independently a functional group selected from the group consisting of hydrogen, C1-C20 alkyl group, C2-C20 alkenyl group, C6-C20 aryl group, C7-C20 alkylaryl group, and C7-C20 arylalkyl group, or two or more adjacent groups may be connected to each other to form an aliphatic or aromatic ring which is substituted or unsubstituted with C1-C10 hydrocarbyl group, $Q_3$ and $Q_4$ are the same as or different from each other, and are each independently is halogen or C1-C10 alkyl group;

M' is a Group 4 transition metal, $X_3$ and $X_4$ are the same as or different from each other, and are each independently halogen or C1-C20 alkyl group, and m is an integer of 0 or 1;

In the metallocene compound of Chemical Formula 3, a substituent of —$(CH_2)$n-OR (wherein R is a linear branched C1-C6 alkyl group and n is an integer of 2 to 4) is introduced into a substituent of cyclopentadiene (Cp) or a derivative thereof, Thereby, during the production of polyolefins using comonomers, it exhibits a lower conversion to a comonomer than other Cp-based catalyst that does not contain the substituent, and can prepare the medium or low molecular weight polyolefin having controlled copolymerization degree or comonomer distribution.

As a more specific example, when the second metallocene compound of Chemical Formula 3 is used together with other metallocene compounds for producing a polyolefin having a high molecular weight region as a hybrid catalyst, the polyolefin in the low molecular weight region can exhibit low copolymerizability due to the function of the second methane compound of Chemical Formula 3. Thus, it is very advantageous to polymerize a polyolefin having a BOCD (Broad Orthogonal Co-monomer Distribution) structure, which is a structure in which the content of the comonomer is concentrated on the high molecular weight main chain, that is, a structure in which side branch content increases toward a higher molecular weight side.

The respective substituents defined by Chemical Formula 3 will be described in more detail as follows.

The C1-C20 alkyl group may include a linear or branched alkyl group.

The aryl group is preferably a C6-C20 aromatic ring, and specific examples thereof include phenyl, naphthyl, anthracenyl, pyridyl, dimethylanilinyl, and anisole, but are not limited thereto.

The alkylaryl group means an aryl group into which one or more linear or branched alkyl groups having 1 to 20 carbon atoms are introduced, and the arylalkyl group means a linear or branched alkyl group into which one or more aryl groups having 6 to 20 carbon atoms are introduced.

The hydrocarbyl group means a monovalent hydrocarbon compound, and examples thereof include an alkyl group, an alkenyl group, an aryl group, an alkylaryl group, an arylalkyl group and the like.

The halogen group means fluorine (F), chlorine (Cl), bromine (Br) and iodine (I).

The Group 4 transition metal defined as M' may be Ti (titanium), Zr (zirconium), hafnium (Hf) or the like, but is not limited thereto.

$Q_3$ and $Q_4$ may be preferably a C1-C20 alkyl group, more preferably a methyl group, an ethyl group, or a propyl group.

$X_3$ and $X_4$ may be preferably a halogen group, more preferably Cl.

In the metallocene compound of one embodiment of the invention, there is a feature that any one or more of $R_{31}$ to $R_{38}$ in Chemical Formula 3 is —$(CH_2)$n-OR (wherein R is a linear or branched C1-C6 alkyl group, and n is an integer of 2 to 4). In Chemical Formula 3, —$(CH_2)$n-OR may be preferably tert-butoxybutyl. More preferably, two cyclopentadiene (Cp) derivatives each comprise a —$(CH_2)$n-OR group, or only any one Cp derivative may contain a —$(CH_2)$n-OR group, and the —$(CH_2)$n-OR group may be a tert-butoxybutyl group.

When the metallocene compound having such a structure is supported on a support, the —$(CH_2)$n-OR group in the substituent can form a covalent bond through a close interaction with a silanol group on the surface of the silica used as the support, and thus stable support polymerization is possible. In addition, the functional group may affect the comonomer incorporation of alpha-olefin comonomer such as 1-butene or 1-hexene. When n in the —$(CH_2)$n-OR has a short alkyl chain of 4 or less, the comonomer incorporation to the alpha-olefin comonomer is lowered while maintaining the overall polymerization activity. Thus, it is advantageous for the production of a polyolefin having a controlled degree of copolymerization without deteriorating other physical properties.

The metallocene compound of Chemical Formula 3 may be represented more specifically by the following Chemical Formulas 3-1 to 3-4.

[Chemical Formulas 3-1]

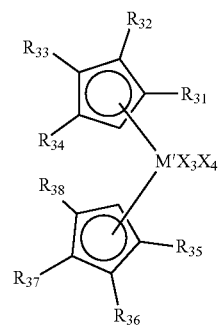

[Chemical Formula 3-2]

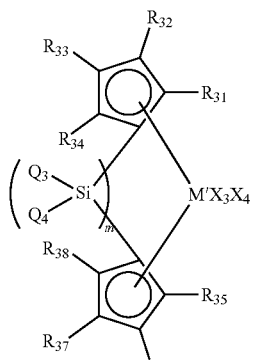

[Chemical Formulas 3-3]

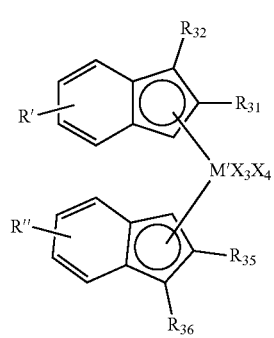

[Chemical Formulas 3-4]

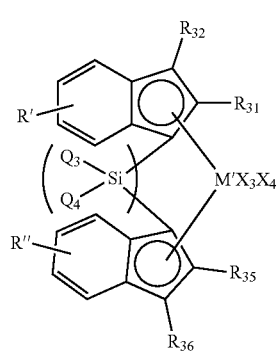

in Chemical Formulas 3-1 to 3-4, $R_{31}$ to $R_{38}$, $Q_3$ to $Q_4$, M', and $X_3$ to $X_4$ are the same as defined in Chemical Formula 3, R and R" are the same as or different from each other, and are each independently a C1-C10 hydrocarbyl group.

The structure of Chemical Formula 3-1 is a case where m is 0 in Chemical Formula 3, which is a structure in which two cyclopentadiene (Cp) groups are non-crosslinked, and any one or more substituents of $R_{31}$ to $R_{38}$ are —$(CH_2)_n$—OR.

The structure of Chemical Formula 3-2 is a case where m is 1 in Chemical Formula 3, which is a structure in which two Cp groups are crosslinked by a $SiQ_3Q_4$ bridge, and any one or more substituents of $R_{31}$ to $R_{38}$ is —$(CH_2)_n$—OR.

The structure of Chemical Formula 3-3 is a case where m is 0 in Chemical Formula 3, which is a structure in which two indene groups formed by connecting adjacent substituents in the Cp group together are non-crosslinked. Any one or more substituents in the substituents $R_{31}$, $R_{32}$, $R_{35}$, and $R_{36}$ of the indene group are —$(CH_2)_n$—OR, and each indene group may be substituted with a C1-C10 hydrocarbyl group (R', R").

The structure of Chemical Formula 3-4 is a case where m is 1 in Chemical Formula 3, which is a structure in which two indene groups formed by connecting adjacent substituents in the Cp group together are crosslinked by $SiQ_3Q_4$ bridge, wherein any one or more substituents in the substituents $R_{31}$, $R_{32}$, $R_{35}$, and $R_{36}$ of the indene group are —$(CH_2)_n$—OR, and each indene group may be substituted with a C1-C10 hydrocarbyl group (R', R").

Meanwhile, specific examples of the metallocene compound represented by Chemical Formula 3 include compounds represented by the following structural formulas.

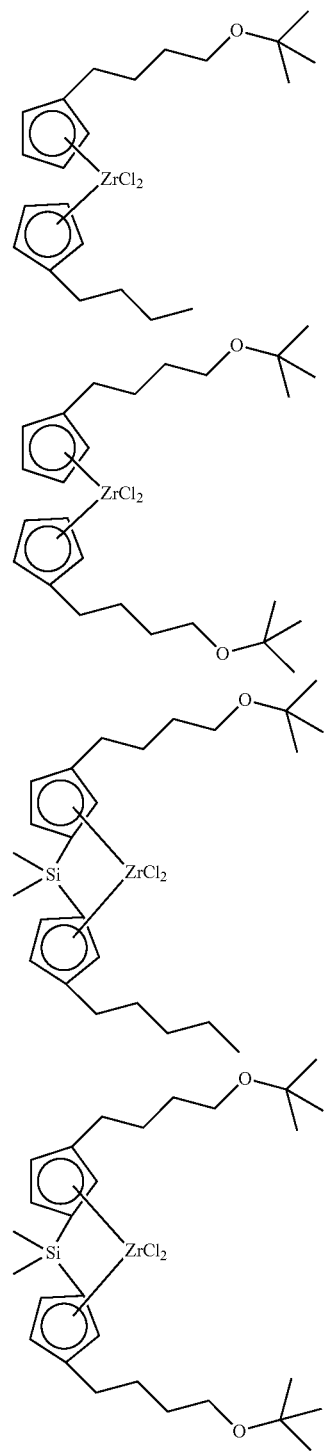

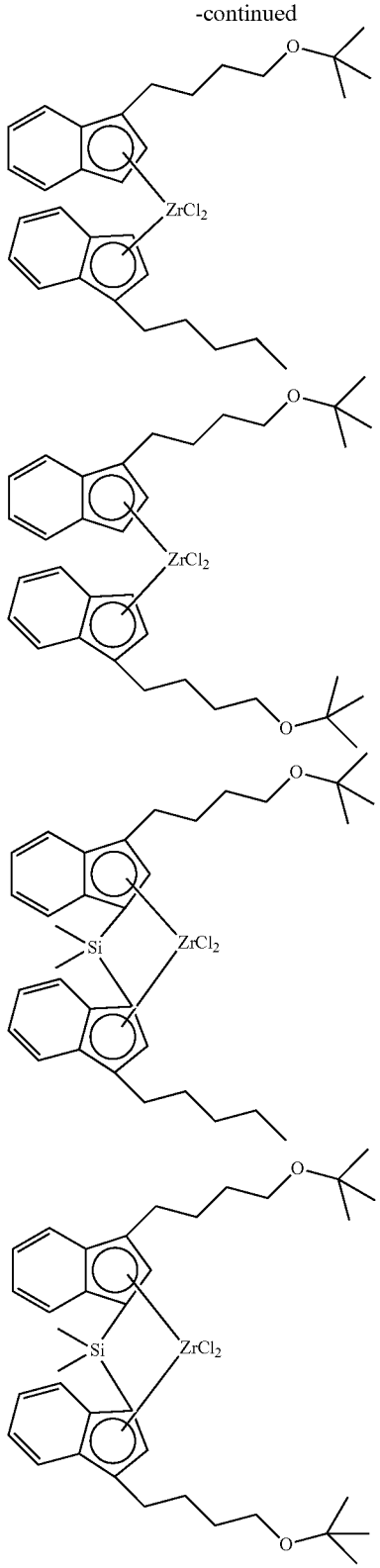

The metallocene compound represented by Chemical Formula 3 may be prepared in accordance with a known method for preparing an organic compound or a transition metal compound.

The metallocene catalyst used in accordance with a specific embodiment of the invention may be a hybrid supported catalyst in which at least one of the first metallocene compound represented by Chemical Formula 1 and at least one of the second metallocene compound selected among the compounds represented by Chemical Formula 3 are supported on a support together with a cocatalyst compound.

In the hybrid supported metallocene catalyst, the cocatalyst to be supported on the support for activation of the metallocene compound is an organometallic compound containing a Group 13 metal, and it is not particularly limited as long as it can be used when polymerizing the olefin in the presence of a general metallocene catalyst.

Specifically, the cocatalyst compound may include at least one of an aluminum-containing first cocatalyst of the following Chemical Formula 4 and a borate-based second cocatalyst of the following Chemical Formula 5.

$$-[Al(R_{39})-O-]_k- \qquad \text{[Chemical Formula 4]}$$

in Chemical Formula 4, $R_{39}$ is each independently a halogen, a halogen-substituted or unsubstituted C1-C20 hydrocarbyl group, and k is an integer of 2 or more, $$T^+[BG_4]^- \qquad \text{[Chemical Formula 5]}$$

in Chemical Formula 5, $T^+$ is a +1 valent polyatomic ion, B is boron in an oxidation state of +3, and G is each independently selected from the group consisting of hydride, dialkylamido, halide, alkoxide, aryloxide, hydrocarbyl, halocarbyl and halo-substituted hydrocarbyl, wherein the G has 20 or less carbon atoms, provided that G is halide at one or less position.

By using the first and the second cocatalysts as above, the polyolefins finally prepared may have more uniform molecular weight distribution, while the polymerization activity can be enhanced.

The first cocatalyst of Chemical Formula 4 may be an alkylaluminoxane-based compound wherein the repeating units are combined into a linear, circular or network form. Specific examples of the first cocatalyst include methylaluminoxane (MAO), ethylaluminoxane, isobutylaluminoxane, butylaluminoxane, and the like.

Further, the second cocatalyst of Chemical Formula 5 may be a trisubstituted ammonium salt, or a dialkylammonium salt, or a trisubstituted phosphate type borate compound. Specific examples of the second cocatalyst include a borate-based compound in the form of a trisubstituted ammonium salt, such as trimethylammonium tetraphenylborate, methyl dioctadecylammonium tetraphenylborate, triethylammonium tetraphenylborate, tripropylammonium tetraphenylborate, tri(n-butyl)ammonium tetraphenylborate, methyltetradecyloctadecylammonium tetraphenylborate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium, tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N, N-dimethylanilinium tetrakis(pentafluorophenyl)borate, N,N-diethylanilinium tetrakis(pentafluorophenyl)borate, N, N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl) borate, tripropylammonium tetrakis(2,3,4,6-tetrafluorophenyl)borate, tri(n-butyl)ammonium tetrakis(2,3,4,6-tetrafluorophenyl) borate, dimethyl(t-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate or N,N-dimethyl-(2,4,6-trimethylanilinium)tetrakis-(2,3,4,6-tetrafluorophenyl)borate and the like; a borate-based compound in the form of a dialkylammonium salt, such as dioctadecylammonium tetrakis(pentafluorophenyl)borate, ditetradecylammonium tetrakis(pentafluorophenyl) borate or dicyclohexylammonium tetrakis(pentafluorophenyl)borate; or a borate-based compound in the form of a trisubstituted phosphonium salt, such as triphenylphosphonium tetrakis(pentafluorophenyl)borate, methyldioctadecylphosphonium tetrakis(pentafluorophenyl)borate or tri(2,6-dimethylphenyl)phosphonium tetrakis(pentafluorophenyl)borate.

In the hybrid supported metallocene catalyst, the mass ratio between the whole transition metals contained in the first metallocene compound represented by the Chemical Formula 1 or the second metallocene compound represented by the Chemical Formula 3 and the support may be 1:10 to 1:1000. When the support and the metallocene compound are contained in the range of the above mass ratio, an optimal shape can be provided. Further, the mass ratio of the cocatalyst compound to the support may be 1:1 to 1:100.

In the hybrid supported metallocene catalyst, as the support, a support containing a hydroxy group on its surface can be used, and preferably a support having highly reactive hydroxy group and siloxane group, of which the surface is dried and removed of moisture can be used.

For example, silica, silica-alumina, silica-magnesia or the like, which are dried at high temperature, can be used, and they may typically contain oxides, carbonates, sulfates, and nitrates such as $Na_2O$, $K_2CO_3$, $BaSO_4$, and $Mg(NO_3)_2$.

The drying temperature of the support is preferably 200 to 800° C., more preferably 300 to 600° C., and most preferably 300 to 400° C. If the drying temperature of the support is lower than 200° C., it retains moisture too much so that moisture on the surface is reacted with the cocatalyst. If the drying temperature is higher than 800° C., pores on the surface of the support are combined with each other to reduce surface area, and many hydroxyl groups are lost on the surface to remain only siloxane groups. Thus, since the reactive sites with cocatalyst are reduced, it is not preferable.

The amount of hydroxyl group on the surface of the support is preferably 0.1 to 10 mmol/g, and more preferably 0.5 to 5 mmol/g. The amount of hydroxyl group on the surface of the support may be controlled depending on the preparation method and conditions of the support, or drying conditions such as temperature, time, vacuum, spray drying, and the like.

If the amount of hydroxyl group is less than 0.1 mmol/g, the reactive sites with cocatalyst are reduced. If the amount of hydroxyl group is more than 10 mmol/g, it is not desirable because it may be caused by moisture besides the hydroxyl groups present on the surface of support particles.

On the other hand, the ethylene/alpha-olefin copolymer according to one embodiment of the present invention can be produced by polymerizing ethylene and alpha-olefin in the presence of the hybrid supported metallocene catalyst described above.

The polymerization reaction may be carried out by copolymerizing ethylene and alpha-olefin, using a continuous slurry polymerization reactor, a loop slurry reactor, a gas phase reactor, or a solution reactor.

Specifically, the ethylene is injected into the reactor in a gaseous state, and the alpha-olefin may be injected into the reactor in a liquid state. At this time, the volume of the alpha-olefin may be 8 ml or more, or 8 ml to 50 ml, or 8 ml to 30 ml. When the volume of the alpha-olefin is reduced to less than 8 ml, in the finally obtained ethylene/alpha-olefin copolymer, the tie molecule fraction decreases while the density being increased, and the amorphous domain thickness and the like are reduced, which may cause a problem that the environmental stress crack resistance is reduced.

Meanwhile, when the ethylene is injected into the reactor in a gaseous state, the pressure of the injected ethylene may be 10 $Kgf/cm^2$ or more, or 10 $Kgf/cm^2$ to 20 $Kgf/cm^2$. When the pressure of the ethylene is reduced to less than 10 $Kgf/cm^2$, in the finally obtained ethylene/alpha-olefin, the weight average molecular weight and the like are decreased and the lamellar crystal thickness and the like are increased, which may cause a problem that the environmental stress crack resistance is reduced.

In this case, according to a specific example, optionally, the polymerization can be carried out by supplying ethylene and alpha-olefin in a single reactor containing a molecular weight regulator. In addition, according to an example, the polymerization may be carried out by supplying the olefin-based monomer in the presence of hydrogen gas.

At this time, the hydrogen gas acts to suppress an abrupt reaction of the metallocene catalyst at the initial stage of polymerization, so that a high molecular weight ethylene/alpha-olefin copolymer can be produced in a larger amount. Therefore, by adjusting the use of the hydrogen gas and the used amount thereof, the ethylene/alpha-olefin copolymer according to one embodiment of the invention can be effectively obtained.

The hydrogen gas may be introduced such that the molar ratio of the hydrogen gas:olefin-based monomer is about 1:100 to 1:1,000. When the amount of hydrogen gas used becomes excessively small, the catalytic activity is not sufficiently realized and so it may become difficult to produce an ethylene/alpha-olefin copolymer having desired properties. When hydrogen gas is introduced in an excessively large amount, the activity of the catalyst may not be fully realized.

Meanwhile, an organoaluminum compound for removing moisture in a reactor is further introduced in the reactor, and the polymerization reaction can proceed in the presence thereof. Specific examples of such organoaluminum compounds include trialkylaluminum, dialkylaluminum halide, alkyl aluminum dihalide, aluminum dialkyl hydride, alkyl aluminum sesquihalide, or the like, and more specific examples thereof include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$, $(C_2H_5)_3Al_2Cl_3$ or the like. Such organoaluminum compounds can be continuously introduced into the reactor, and may be introduced at a rate of about 0.1 to 10 moles per kg of the reaction medium introduced into the reactor for proper removal of moisture.

The polymerization temperature may be about 25 to about 500° C., or about 25 to about 200° C., or about 50 to about 150° C. Further, the polymerization pressure may be from about 1 to about 100 $Kgf/cm^2$, or from about 1 to about 50 $Kgf/cm^2$, or from about 5 to about 30 $Kgf/cm^2$.

The supported metallocene catalyst can be injected after being dissolved or diluted in an aliphatic hydrocarbon solvent having 5 to 12 carbon atoms such as pentane, hexane, heptane, nonane, decane, and isomers thereof, an aromatic hydrocarbon solvent such as toluene and benzene; or a hydrocarbon solvent substituted with chlorine atom such as dichloromethane and chlorobenzene. It is preferable that the solvent is used after a small amount of water, air or the like acting as a catalyst poison is removed by treating with a small amount of aluminum. It may also be performed using an additional cocatalyst.

The ethylene/alpha-olefin copolymer of one embodiment can be produced by copolymerizing ethylene and alpha-olefin monomers, using the aforementioned two metallocene catalysts having different properties.

The ethylene/alpha-olefin copolymer having the desired properties can be produced by variously adjusting the type and content of the first and second metallocene compounds, the amount of hydrogen gas introduced, the content of comonomer, and the addition of the molecular weight regulator. That is, the reactivity of the first and second metallocene compounds to hydrogen and the molecular weight regulator, the incorporation rates of the alpha-olefin comonomer are different, respectively. Therefore, an ethylene/alpha-olefin copolymer having the above-mentioned physical properties can be prepared depending on the selective combination of the metallocene compound in a reactor, the selective combination of the metallocene compound, the amount of hydrogen gas introduced, and the addition of a molecular weight modifier.

The ethylene/alpha-olefin copolymer thus prepared has a high environmental stress crack resistance by appropriately controlling the range of the factors that can influence improvement of environmental stress crack resistance (dc, da, da/dc and the tie molecule fraction based on the content of the ethylene/alpha-olefin copolymer), and optimizing the structure of the polymer, and thus can be suitably used for pipes, various containers, bottle caps, cartridges and the like that require stability in high-pressure and high-temperature environments.

Hereinafter, preferred examples are provided for better understanding of the present invention. However, these examples are for illustrative purposes only and the invention are not intended to be limited by these examples.

EXAMPLE

Preparation Example of Metallocene Compound and Supported Catalyst

Synthesis Example 1: Synthesis of First Metallocene Compound

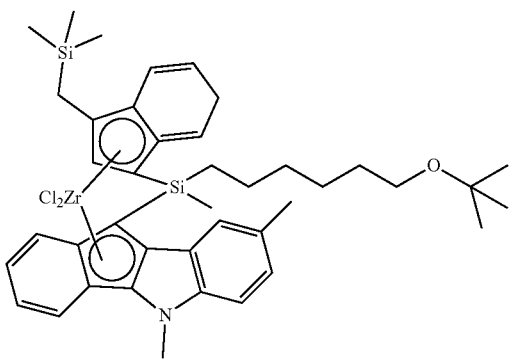

1-1. Preparation of Ligand Compound 2.331 g (10 mmol) of indenoindole was added to a dried 250 mL Schlenk flask, and 40 mL of ether was injected under argon. The ether solution was cooled to 0° C. and then 4.8 mL (12 mmol) of 2.5 M nBuLi hexane solution was slowly added dropwise thereto. The reaction mixture was slowly warmed up to room temperature and then stirred until the next day. Another 250 mL Schlenk flask was filled with 20 mL of ether and then 3.6 mL (30 mmol) of dichloromethyl(tertbutoxyhexyl)silane was injected. The flask was cooled to −78° C., to which a lithiated solution of indenoindole was injected through a cannula. After completion of the injection, the mixture was slowly warmed up to room temperature, and then stirred for about 5 hours and then stirred for one day. Then, the flask was quenched by adding 50 ml of water, and the organic layer was separated and dried over $MgSO_4$. The ether used as solvent was removed under reduced pressure. It was confirmed by NMR that 10-((6-(tert-butoxy)hexyl)chloro(methyl)silyl)-5,8-dimethyl-5,10-dihydroindeno[1,2-b]indole having a purity of 95% or more was obtained.

After the synthesis of the indenoindole part was confirmed, 1.7 g (10 mmol) of ((1H-inden-3-yl)methyl)trimethylsilane was added to a dried 100 mL Schlenk flask and dissolved in 40 mL of ether. Then, 4.8 ml (12 mmol) of 2.5 M n-BuLi hexane solution was slowly added dropwise at −78° C. and stirred for one day. 10-((6-(tert-butoxy)hexyl)chloro(methyl)silyl)-5,8-dimethyl-5,10-dihydroindeno[1,2-b]indole previously synthesized was dissolved in 40 ml of ether and then a lithiated solution of ((1H-inden-3-yl)methyl)trimethylsilane was added dropwise at −78° C. After about 20 hours, the flask was quenched by adding 50 mL of water, and the organic layer was separated and dried over $MgSO_4$. The mixture obtained through filtration was subjected to a vacuum-reduced pressure to evaporate a solvent.

As a result, 6.5 g (10.2 mmol, 100%) of 10-((6-(tert-butoxy)hexyl)(methyl)(3-((trimethylsilyl)methyl)-1H-inden-1-yl)silyl)-5,8-dimethyl-5,10-dihydroindeno[1,2-b]indo as a yellow oil was obtained.

Mw: 634.05, purity (wt %)=100%

1H NMR (500 MHz, CDCl3): −0.40, −0.37 (3H, d), 0.017 (9H, m), 1.10 (4H, m), 1.18 (9H, s), 1.34 (6H, m), 2.41 (3H, m), 3.25 (2H, m), 3.25 (1H, m), 3.53 (1H, m), 4.09 (3H, s), 5.62, 5.82, 5.95, 5.95, 6.11 (1H, s), 7.04~7.32 (9H, m), 7.54 (1H, m), 7.75 (1H, m).

1-2. Preparation of Metallocene Compound

The ligand was added to an oven-dried 250 mL Schlenk flask, and then dissolved in ether, and 2.1 equivalents of nBuLi solution was added and lithiated until the next day. 1 equivalent of $ZrCl_4(THF)_2$ was taken in a glove box and placed in a 250 ml Schlenk flask to prepare a suspension containing ether or toluene. The two flasks all were cooled down to −78° C. and then the ligand anion was slowly added to a Zr suspension. After completion of the injection, the reaction mixture was gradually warmed up to room temperature. When the metallization was successfully performed in this process, it was confirmed that a purple peculiar to the catalyst precursor appeared.

After stirring for one day, toluene or ether in the mixture was removed up to a volume of about ⅕ through vacuum and reduced pressure, and hexane was added in a volume of about 5 times that of the remaining solvent. The reason for adding hexane at this time is to promote the crystallization because the synthesized catalyst precursor has reduced solubility in hexane. This hexane slurry was filtered under argon, filtered, and then both the filtered solid and the filtrate were evaporated under vacuum and reduced pressure. The remaining filter cake was weighed and sampled in a glove box to identify the synthesis, yield and purity. Ether was used as the solvent for metallization, and 6.08 g (76.5%) of a purple solid were obtained from 6.4 g (10 mmol) of ligand.

NMR standard purity (wt %)=100%, Mw=794.17

1H NMR (500 MHz, CDCl3): −0.23, −0.16 (9H, d), 0.81 (3H, m), 1.17 (9H, m), 1.20~1.24 (3H, m), 1.31 (2H, s), 1.62~1.74 (5H, m), 1.99~2.11 (2H, m), 2.55 (3H, d), 3.33 (2H, m), 3.95, 4.13 (3H, s), 5.17, 5.21, 5.32 (1H, s), 6.89~7.07 (3H, m), 7.12~7.21 (3H, m), 7.29 (1H, m), 7.36 (1H, m), 7.44 (1H, m), 7.84 (1H, m).

Synthesis Example 2: Synthesis of Second Metallocene Compound

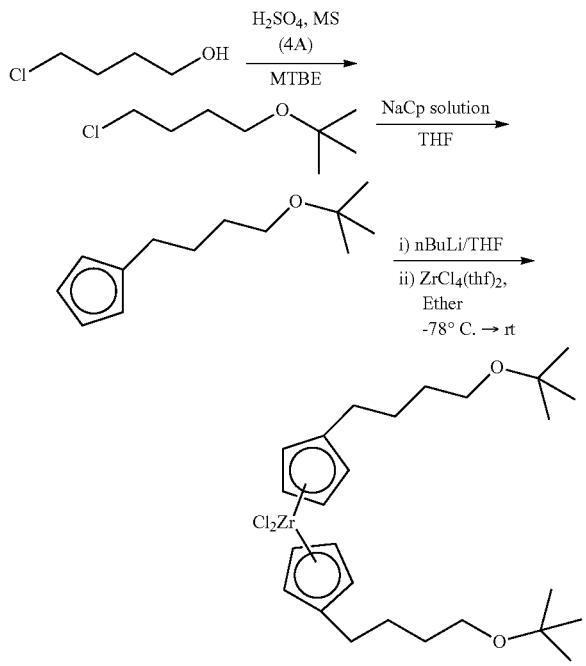

2-1. Preparation of Ligand Compound 10.8 g (100 mmol) of chlorobutanol was added to a dried 250 mL Schlenk flask, to which 10 g of molecular sieve and 100 mL of MTBE were added and then 20 g of sulfuric acid was slowly added over 30 minutes. The reaction mixture slowly changed to pink over time. After 16 hours, it was poured into saturated sodium bicarbonate solution cooled in an ice bath. Ether (100 mL×4) was added to this mixture and extracted several times. The collected organic layers were dried over MgSO$_4$. After filtration, the solvent was removed under vacuum and reduced pressure. Thereby, 10 g (yield: 60%) of 1-(tertbutoxy)-4-chlorobutane in the form of yellow liquid was obtained.

$^1$H NMR (500 MHz, CDCl$_3$): 1.16 (9H, s), 1.67~1.76 (2H, m), 1.86~1.90 (2H, m), 1.94 (1H, m), 3.36 (2H, m), 3.44 (1H, m), 3.57 (3H, m)

4.5 g (25 mmol) of 1-(tertbutoxy)-4-chlorobutane synthesized above was added to a dried 250 mL Schlenk flask and dissolved in 40 mL of THF. 20 mL of sodium cyclopentadienylide THF solution was added slowly thereto and stirred for one day. 50 mL of water was added to the reaction mixture, quenched, and extracted with ether (50 mL×3). The collected organic layer was sufficiently washed with brine. The remaining moisture was dried with MgSO4, filtered, and then the solvent was removed under vacuum and reduced pressure. Thereby, 2-(4-(tert-butoxy)butyl)cyclopenta-1,3-diene in a dark brown viscous form was obtained in quantitative yield.

$^1$H NMR (500 MHz, CDCl$_3$): 1.16 (9H, s), 1.54~1.60 (4H, m), 1.65 (1H, m), 1.82 (1H, m), 2.37~2.42 (2H, m), 2.87, 2.92 (2H, s), 3.36 (2H, m), 5.99 (0.5H, s), 6.17 (0.5H, s), 6.25 (0.5H, s), 6.34 (0.5H, s), 6.42 (1H, s)

2-2. Preparation of Metallocene Compound 4.3 g (23 mmol) of the ligand compound synthesized in 1-1 was added to a dried 250 mL Schlenk flask and dissolved in 60 mL of THF. 11 mL of n-BuLi 2.0M hexane solution (28 mmol) was added thereto and stirred for one day. This solution was slowly added at −78° C. to a flask containing 3.83 g (10.3 mmol) of ZrCl$_4$(THF)$_2$ dispersed in 50 mL of ether.

When this reaction mixture was warmed up to room temperature, a turbid yellow color in a light brown suspension was changed in the form of a suspension. After stirring for one day, all solvent in the reaction mixture were dried and 200 mL of hexane was added. The mixture was sonicated and settled. The hexane solution floating on the upper layer was collected by decantation with cannula. The hexane solution obtained by repeating this process twice was dried under vacuum and reduced pressure. Thereby, it was confirmed that bis(3-(4-(tert-butoxy)butyl-2,4-dienyl)zirconium (IV) chloride was produced as a pale yellow solid.

$^1$H NMR (500 MHz, CDCl$_3$): 0.84 (6H, m), 1.14 (18H, s), 1.55~1.61 (8H, m), 2.61 (4H, m), 3.38 (4H, m), 6.22 (3H, s), 6.28 (3H, s)

Preparation Example 1: Preparation of Supported Catalyst 50 mL of toluene solution was added to a 300 mL glass reactor, to which 10 g of dried silica (SP 2410, manufactured by Grace Davison) was added and then stirred while raising the reactor temperature to 40° C. 60 mL of 10 wt % methylaluminoxane (MAO)/toluene solution was added thereto. After raising the temperature to 60° C., the mixture was stirred at 200 rpm for 12 hours. After lowering the reactor temperature to 40° C., stirring was stopped and settling was performed for 10 minutes, and then the reaction solution was subjected to decantation. Again, 100 mL of toluene was added thereto and stirred for 10 minutes. Stirring was stopped and settling was performed for 10 minutes, and the toluene solution was subjected to decantation.

50 mL of toluene was added to the reactor, 0.50 g of the metallocene compound of Synthesis Example 1 as a high molecular weight catalyst precursor and 10 mL of toluene were added to a reactor, and the mixture was stirred at 200 rpm for 60 minutes. 0.5 g of the metallocene compound of Synthesis Example 2 as a low molecular weight catalyst precursor and 10 mL of toluene were added to the reactor, and the mixture was stirred at 200 rpm for 12 hours.

Subsequently, stirring was stopped and settling was performed for 10 minutes, and then the reaction solution was subjected to decantation. 100 mL of hexane was added to the reactor, and the hexane slurry was transferred to a 250 mL Schlenk flask and the hexane solution was subjected to decantation, and dried under reduced pressure at room temperature for 3 hours to prepare a hybrid supported metallocene catalyst.

Preparation of Ethylene/Alpha-Olefin Copolymer

Example 1

The catalyst was prepared by quantifying 50 mg of the supported catalyst prepared in Preparation Example 1 in a dry box, putting it in a 50 mL glass bottle, sealing the same with a rubber diaphragm, and taking the bottle out of the dry box. The polymerization was carried out in a 2 L metal alloy reactor equipped with a mechanical stirrer which enabled temperature control and was used at high pressure.

After putting 1 L of hexane containing 1.0 mmol of triethylaluminum and 8 mL of 1-butene in the reactor and adding the supported catalyst prepared above to the reactor without contacting with air, the polymerization was carried out at for 1 hour while continuously providing ethylene monomer gas at 80° C. with the pressure of 10 Kgf/cm². The polymerization was terminated by first stopping stirring, and venting and removing ethylene gas. The polymerization solvent was removed from the obtained polymer by filtering the same, and the polymer was dried at 80° C. for 4 hours in a vacuum oven.

Example 2

Ethylene/alpha-olefin copolymer was prepared in the same manner as in Example 1, except that the injection amount of 1-butene was changed to 30 mL.

Comparative Example 1

Ethylene/alpha-olefin copolymer was prepared in the same manner as in Example 1, except that the injection amount of 1-butene was changed to 5 mL.

Comparative Example 2

Ethylene/alpha-olefin copolymer was prepared in the same manner as in Example 1, except that the pressure of ethylene monomer gas was changed to 8 Kgf/cm².

Comparative Example 3

Ethylene/alpha-olefin copolymer was prepared in the same manner as in Example 1 except that the pressure of ethylene monomer gas was changed to 7 Kgf/cm².

The ethylene/alpha-olefin copolymers prepared in Examples and in Comparative Examples were evaluated for their physical properties by the following methods.

1) Density: ASTM 1505

2) Weight average molecular weight (Mn) and the molecular weight distribution: The sample was melted and pre-treated in 1,2,4-trichlorobenzene containing BHT 0.0125% using PL-SP260 at 160° C. for 10 hours, and the weight average molecular weight and the number average molecular weight were measured at a temperature of 160° C. using PL-GPC220. The molecular weight distribution was calculated therefrom. At this time, the calibration curve of GPC was calculated using polystyrene as a standard material.

3) SAXS analysis, and measurement of dc, da and da/dc

SAXS analysis was performed using the 4C beamline of a Pohang Accelerator Laboratory (PAL). Through such SAXS analysis, the SAXS analysis result of FIG. 2a for Example 1 was derived, and the analysis result was similarly derived for Example 2.

The scattering intensity of each peak was confirmed from the analysis results of SAXS, and it was confirmed that the relationship of $q_1:q_2=1:2$ or $q_1:q_2:q_3=1:2:3$ between the peaks was satisfied. From these, it was confirmed that the copolymers of Examples and Comparative Examples contained a plurality of lamellar crystals, and an amorphous domain was contained between them.

From the pattern of the position (q, x axis) vs. scattering intensity (y axis) of the scattering vector obtained as a result of the SAXS analysis, the smaller scattering vector region (e.g., Guinier region of FIG. 2b) and a larger scattering vector region (e.g., Porod region of FIG. 2b) were distinguished. The smaller scattering vector region was approximated using a quadratic equation, and the larger scattering vector region was approximated using Vonk's equation. The total function value of the scattering intensity for each scattering vector with respect to the total scattering vector region thus obtained was derived as a normalized correlation function (γ1) using the following equation 3, and thereby, a graph as shown in FIG. 2c for Example 1 was obtained and the graph was similarly obtained for Example 2.

Normalized correlation function ($\gamma1(x)$) [Equation 3]

$$\gamma1(x) = \frac{\oint(I(q)-B(q))q^2\cos qx\,dq}{\oint(I(q)-B(q))q^2\,dq}$$

in the above equation 3, x represents an actual spatial distance, $\gamma_1$ represents a normalized correlation function, q represents the position of the scattering vector, I(q) represents the scattering intensity for each scattering vector, and B(q) represents a background scattering intensity.

From the graph of FIG. 2c, a linear section at x=0 was fitted to obtain a straight line (e.g., red straight line in FIG. 2c), and the distance x (nm) value among the coordinates of the points at which the straight lines met the extended line of the lowermost point of the graph (black dotted line in FIG. 2c) was measured/calculated as the thickness da of the amorphous domain. Further, in the above graph, the distance x (nm) value in the coordinates of the peak point (e.g., LP in FIG. 2c) was measured/calculated by the sum of dc+da, and from these, the thickness ratio defined by the thickness dc of the lamellar crystal and the formula of da/dc was calculated.

The dc, da, da/dc, and LP values measured and calculated in the above procedure are summarized together in Table 1 below.

4) Tie molecule fraction

The tie molecule fractions contained in the copolymers of Examples/Comparative Examples were calculated from the measured values of dc and da of the above (3) and the calculation result of the following equation 1. For reference, in the equation 1, the denominator expression means the distribution of end-to-end distance of the entire polymer chain (random coil), and thereby the equation 1 means the probability that both ends of the polymer chain are present at the distance between the two lamellar crystals and the amorphous domain contained between them (that is, the probability of existence, referred to as a tie molecule fraction), in the distribution of end-to-end distance of the entire polymer chain (random coil).

$$P(Mw) = \frac{1}{3}\left(\frac{\int_{2d_c+d_a}^{\infty} r^2\exp(-b^2r^2)\,dr}{\int_0^{\infty} r^2\exp(-b^2r^2)\,dr}\right)$$ [Equation 1]

in the above equation 1, P(Mw) represents a tie molecule fraction on the basis of molecular weight, dc and da are a lamellar crystal thickness (dc) and an amorphous domain thickness (da), <r> represents an end-to-end distance of a random coil according to the molecular weight (Mw), and $b^2$ is $3/(2<r>^2)$.

Further, the <r> was calculated as a value according to the molecular weight by the formula of $<r>/(Mw)^{1/2}*10^4=1070$ nm.

TABLE 1

|  | Density (g/cm³) | Mw (g/mol) | Molecular weight distribution | LP (nm) | da (nm) | dc (nm) | da/dc | Tie Molecule fraction |
|---|---|---|---|---|---|---|---|---|
| Example 1 | 0.938 | 103000 | 4.23 | 17.7 | 4.5 | 13.2 | 0.341 | 0.0996 |
| Example 2 | 0.934 | 96000 | 4.04 | 17.4 | 4.5 | 12.9 | 0.349 | 0.0947 |
| Comparative Example 1 | 0.961 | 83000 | 4.81 | 26.1 | 4.7 | 21.4 | 0.220 | 0.0046 |
| Comparative Example 2 | 0.955 | 80000 | 4.53 | 23.0 | 4.5 | 18.5 | 0.243 | 0.0123 |
| Comparative Example 3 | 0.952 | 113000 | 5.81 | 24.6 | 5.2 | 19.4 | 0.268 | 0.0405 |

Referring to Table 1, it was confirmed that the copolymers of Examples exhibited crystal structure characteristics different from those of Comparative Examples in terms of the characteristics such as dc, da/dc and tie molecule fraction.

EXPERIMENTAL EXAMPLE

The ethylene/alpha-olefin copolymers prepared in Examples and in Comparative Examples were evaluated for their physical properties by the following methods.
1) ESCR (Environmental Stress Crack Resistance): Measured According to ASTM D1693.
The results are shown in Table 2 below.

TABLE 2

|  | ESCR (hr) |
|---|---|
| Example 1 | 120 |
| Example 2 | 188 |
| Comparative Example 1 | 5 |
| Comparative Example 2 | 4.5 |
| Comparative Example 3 | 14 |

Referring to Table 2, it was confirmed that as the copolymers of Examples exhibited crystal structure characteristics different from those of Comparative Examples in terms of the characteristics such as dc, da/dc and tie molecule fraction, they exhibited greatly improved environmental stress crack resistance as compared with Comparative Examples.

The invention claimed is:

1. An ethylene/alpha-olefin copolymer comprising an ethylene repeating unit and an alpha-olefin repeating unit,
   wherein the copolymer has a crystal structure including a crystalline domain containing lamellar crystals and an amorphous domain containing a tie molecule that mediates bonding between the lamellar crystals, and
   wherein the lamellar crystal thickness (dc) calculated from the result of Small Angle X-ray Scattering (SAXS) analysis is between 12.0 and 16.0 nm, the amorphous domain thickness (da) is between 4.0 and 5.3 nm, and the thickness ratio da/dc is between 0.3 and 0.4.

2. The ethylene/alpha-olefin copolymer of claim 1, wherein a tie molecule fraction P(Mw) on the basis of molecular weight is 0.07 and 0.1, and the tie molecule fraction P(Mw) is calculated from the following Equation 1:

$$P(Mw) = \frac{1}{3}\left(\frac{\int_{2d_c+d_a}^{\infty} r^2 \exp(-b^2 r^2)\,dr}{\int_{0}^{\infty} r^2 \exp(-b^2 r^2)\,dr}\right) \quad [\text{Equation 1}]$$

wherein in equation 1, <r> represents an end-to-end distance of a random coil according to the molecular weight (Mw), and $b^2$ is $3/(2<r>^2)$.

3. The ethylene/alpha-olefin copolymer of claim 1, wherein the ethylene/alpha-olefin copolymer has a weight average molecular weight (Mw) of 85000 g/mol to 150000 g/mol.

4. The ethylene/alpha-olefin copolymer of claim 1, wherein the ethylene/alpha-olefin copolymer has a density of 0.930 g/cm3 to 0.965 g/cm3.

5. The ethylene/alpha-olefin copolymer of claim 1, wherein the alpha-olefin is any one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene and 1-hexadecene.

6. The ethylene/alpha-olefin copolymer of claim 1, wherein the environmental stress crack resistance (ESCR) of the ethylene/alpha-olefin copolymer measured according to ASTM D 1693 is 100 hours or more.

7. The ethylene/alpha-olefin copolymer of claim 5, wherein the alpha-olefin is 1-butene.

8. The ethylene/alpha-copolymer of claim 1, wherein the lamellar crystal thickness (dc) is between 12.0 and 13.5 nm, the amorphous domain thickness (da) is 4.5 nm, and the thickness ratio da/dc is between 0.3 and 0.4.

9. The ethylene/alpha-olefin copolymer of claim 4, wherein the ethylene/alpha-olefin copolymer has a density of 0.930 g/cm3 to 0.940 g/cm3.

10. The ethylene/alpha-olefin copolymer of claim 2, wherein the tie molecule fraction P(Mw) is 0.09 and 0.1.

11. The ethylene/alpha-olefin copolymer of claim 6, wherein the environmental stress crack resistance (ESCR) of the ethylene/alpha-olefin copolymer measured according to ASTM D 1693 is between 100 and 200 hours.

* * * * *